US007857699B2

(12) United States Patent
Baerlocher

(10) Patent No.: US 7,857,699 B2
(45) Date of Patent: Dec. 28, 2010

(54) GAMING SYSTEM AND METHOD OF OPERATING A GAMING SYSTEM HAVING A BONUS PARTICIPATION BIDDING SEQUENCE

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1063 days.

(21) Appl. No.: 11/555,516

(22) Filed: Nov. 1, 2006

(65) Prior Publication Data

US 2008/0102920 A1 May 1, 2008

(51) Int. Cl.
*G06F 17/00* (2006.01)

(52) U.S. Cl. ........................................................ 463/27

(58) Field of Classification Search .............. 463/16–27
See application file for complete search history.

(56) References Cited

U.S. PATENT DOCUMENTS 2,068,379 A 1/1937 Frantz et al.
4,009,522 A 3/1977 Borianne
4,093,215 A 6/1978 Ballard
4,093,235 A 6/1978 Barry
4,140,319 A 2/1979 Aycock et al.
4,146,233 A 3/1979 Musolino
4,261,575 A 4/1981 Matthews et al.
4,302,016 A 11/1981 Astle et al.
4,332,386 A 6/1982 Townsend
4,437,670 A 3/1984 Simon
4,440,397 A 4/1984 Butner
4,484,748 A 11/1984 Becze
4,569,526 A 2/1986 Hamilton
4,637,614 A 1/1987 Gibbon et al.
4,666,160 A 5/1987 Hamilton
4,890,842 A 1/1990 Plange
4,890,843 A 1/1990 Chauve (Continued)

FOREIGN PATENT DOCUMENTS

AU 2002/367823 10/2003

(Continued)

OTHER PUBLICATIONS

Auction Fever Advertisement, written by Sierra Design Group, available prior to Nov. 1, 2006.

(Continued)

*Primary Examiner*—Ronald Laneau
(74) *Attorney, Agent, or Firm*—K&L Gates LLP

(57) ABSTRACT

A gaming system where, as players place wagers to play the primary games of the gaming devices, a portion or percentage of the wager placed by each player to initiate the primary game is allocated to an accumulated value pool. A target value is based on the average expected payout of a bonus event. In one embodiment, if the accumulated value pool meets or exceeds the target value, a bidding sequence is triggered. During the bidding sequence, the central controller enables each of the players playing at the gaming devices to place one or more bids for the opportunity to participate in the bonus event. In one embodiment, the player who places the highest bid participates in the bonus event and is provided with a bonus award, wherein the bonus award may be equal to, higher than, or lower than the winning bid.

57 Claims, 13 Drawing Sheets

U.S. PATENT DOCUMENTS

| | | | |
|---|---|---|---|
| 4,900,027 | A | 2/1990 | Sheridan |
| 4,910,775 | A | 3/1990 | Yves et al. |
| 4,926,327 | A | 5/1990 | Sidley |
| 4,927,156 | A | 5/1990 | Breslow et al. |
| 5,011,158 | A | 4/1991 | Roberts et al. |
| 5,076,588 | A | 12/1991 | Minh |
| 5,078,405 | A | 1/1992 | Jones et al. |
| 5,083,271 | A | 1/1992 | Thacher et al. |
| 5,163,687 | A | 11/1992 | Jenkins |
| 5,280,909 | A | 1/1994 | Tracy |
| 5,292,133 | A | 3/1994 | Alexander |
| 5,326,104 | A | 7/1994 | Pease et al. |
| 5,342,056 | A | 8/1994 | Ajaji |
| 5,344,144 | A | 9/1994 | Canon |
| 5,347,306 | A | 9/1994 | Nitta |
| 5,445,391 | A | 8/1995 | Gleason, Jr. |
| 5,539,450 | A | 7/1996 | Handelman |
| 5,542,669 | A | 8/1996 | Charron et al. |
| 5,564,700 | A | 10/1996 | Celona |
| 5,564,701 | A | 10/1996 | Dettor |
| 5,584,485 | A | 12/1996 | SoRelle et al. |
| 5,592,212 | A | 1/1997 | Handelman |
| 5,611,535 | A | 3/1997 | Tiberio |
| 5,645,486 | A | 7/1997 | Nagao et al. |
| 5,655,961 | A | 8/1997 | Acres et al. |
| 5,668,591 | A | 9/1997 | Shintani |
| 5,695,400 | A | 12/1997 | Fennell, Jr. et al. |
| 5,702,304 | A | 12/1997 | Acres et al. |
| 5,741,183 | A | 4/1998 | Acres et al. |
| 5,749,785 | A | 5/1998 | Rossides |
| 5,752,882 | A | 5/1998 | Acres et al. |
| 5,766,076 | A | 6/1998 | Pease et al. |
| 5,772,509 | A | 6/1998 | Weiss |
| 5,779,547 | A | 7/1998 | SoRelle et al. |
| 5,779,549 | A | 7/1998 | Walker et al. |
| 5,788,235 | A | 8/1998 | Thomas |
| 5,820,459 | A | 10/1998 | Acres et al. |
| 5,830,063 | A | 11/1998 | Brune |
| 5,836,817 | A | 11/1998 | Acres et al. |
| 5,851,149 | A | 12/1998 | Para et al. |
| 5,855,515 | A | 1/1999 | Pease et al. |
| 5,876,283 | A | 3/1999 | Parra et al. |
| 5,876,284 | A | 3/1999 | Acres et al. |
| 5,885,158 | A | 3/1999 | Torango et al. |
| 5,890,963 | A | 4/1999 | Yen |
| 5,917,725 | A | 6/1999 | Thacher et al. |
| 5,947,820 | A | 9/1999 | Morro et al. |
| 5,951,011 | A | 9/1999 | Potter et al. |
| 5,957,775 | A | 9/1999 | Cherry |
| 5,997,002 | A | 12/1999 | Goldman |
| 6,001,016 | A | 12/1999 | Walker et al. |
| 6,009,458 | A | 12/1999 | Hawkins et al. |
| 6,015,344 | A | 1/2000 | Kelly et al. |
| 6,030,288 | A | 2/2000 | Davis et al. |
| 6,045,447 | A | 4/2000 | Yoshizawa et al. |
| 6,065,752 | A | 5/2000 | Beltran |
| 6,077,162 | A | 6/2000 | Weiss |
| 6,089,980 | A | 7/2000 | Gauselmann |
| 6,110,041 | A | 8/2000 | Walker et al. |
| 6,142,872 | A | 11/2000 | Walker et al. |
| 6,162,122 | A | 12/2000 | Acres et al. |
| 6,165,072 | A | 12/2000 | Davis et al. |
| 6,174,237 | B1 | 1/2001 | Stephenson |
| 6,192,347 | B1 | 2/2001 | Graff |
| 6,200,216 | B1 | 3/2001 | Peppel |
| 6,206,782 | B1 | 3/2001 | Walker et al. |
| 6,224,482 | B1 | 5/2001 | Bennett |
| 6,231,445 | B1 | 5/2001 | Acres |
| 6,236,900 | B1 | 5/2001 | Geiger |
| 6,241,608 | B1 | 6/2001 | Torango |
| 6,244,958 | B1 | 6/2001 | Acres |
| 6,254,483 | B1 | 7/2001 | Acres |
| 6,257,981 | B1 | 7/2001 | Acres et al. |
| 6,260,019 | B1 | 7/2001 | Courts |
| 6,293,864 | B1 | 9/2001 | Romero |
| 6,296,569 | B1 | 10/2001 | Congello, Jr. |
| 6,311,976 | B1 | 11/2001 | Yoseloff et al. |
| 6,312,332 | B1 | 11/2001 | Walker et al. |
| 6,312,333 | B1 | 11/2001 | Acres |
| 6,315,660 | B1 | 11/2001 | Demar et al. |
| 6,319,122 | B1 | 11/2001 | Packes, Jr. et al. |
| 6,319,125 | B1 | 11/2001 | Acres |
| 6,336,862 | B1 | 1/2002 | Brune |
| 6,356,539 | B1 | 3/2002 | Zuliani et al. |
| 6,358,147 | B1 | 3/2002 | Jaffe et al. |
| 6,364,768 | B1 | 4/2002 | Acres et al. |
| 6,371,852 | B1 | 4/2002 | Acres |
| 6,375,567 | B1 | 4/2002 | Acres |
| 6,375,568 | B1 | 4/2002 | Roffman et al. |
| 6,375,569 | B1 | 4/2002 | Acres |
| 6,386,975 | B1 | 5/2002 | Peterson |
| 6,409,172 | B1 | 6/2002 | Vancura |
| 6,431,983 | B2 | 8/2002 | Acres |
| 6,435,511 | B1 | 8/2002 | Vancura et al. |
| 6,443,841 | B1 | 9/2002 | Rossides |
| 6,468,159 | B1 | 10/2002 | La Mura et al. |
| 6,482,089 | B2 | 11/2002 | Demar et al. |
| 6,506,117 | B2 | 1/2003 | Demar et al. |
| 6,508,707 | B2 | 1/2003 | Demar et al. |
| 6,520,855 | B2 | 2/2003 | Demar et al. |
| 6,565,434 | B1 | 5/2003 | Acres |
| 6,565,442 | B2 | 5/2003 | La Mura et al. |
| 6,571,344 | B1 | 5/2003 | Sitnik |
| 6,575,831 | B1 | 6/2003 | Gonen et al. |
| 6,575,832 | B1 | 6/2003 | Manfredi et al. |
| 6,582,302 | B2 | 6/2003 | Romero |
| 6,585,586 | B1 | 7/2003 | Romero |
| 6,592,459 | B2 | 7/2003 | Parra et al. |
| 6,592,460 | B2 | 7/2003 | Torango |
| 6,607,438 | B2 | 8/2003 | Baerlocher et al. |
| 6,607,441 | B1 | 8/2003 | Acres |
| 6,620,046 | B2 | 9/2003 | Rowe |
| 6,626,758 | B1 | 9/2003 | Parham et al. |
| 6,632,141 | B2 | 10/2003 | Webb et al. |
| 6,632,142 | B2 | 10/2003 | Keith |
| 6,648,753 | B1 | 11/2003 | Tracy et al. |
| 6,652,378 | B2 | 11/2003 | Cannon et al. |
| 6,656,047 | B1 | 12/2003 | Tarantino et al. |
| 6,656,050 | B2 | 12/2003 | Busch et al. |
| 6,659,861 | B1 | 12/2003 | Faris et al. |
| 6,676,513 | B2 | 1/2004 | Gauselmann |
| 6,676,521 | B1 | 1/2004 | La Mura et al. |
| 6,688,973 | B2 | 2/2004 | Satloff et al. |
| 6,688,976 | B1 | 2/2004 | Tulley et al. |
| 6,692,354 | B2 | 2/2004 | Tracy et al. |
| 6,709,330 | B1 | 3/2004 | Klein et al. |
| 6,712,697 | B2 | 3/2004 | Acres |
| 6,718,312 | B1 | 4/2004 | McAfee et al. |
| 6,726,562 | B2 | 4/2004 | Vancura |
| 6,735,324 | B1 | 5/2004 | McKinley et al. |
| 6,745,236 | B1 | 6/2004 | Hawkins et al. |
| 6,746,332 | B1 | 6/2004 | Ing et al. |
| 6,749,510 | B2 | 6/2004 | Giobbi |
| 6,758,746 | B1 | 7/2004 | Hunter et al. |
| 6,758,748 | B2 | 7/2004 | Byrne |
| 6,760,861 | B2 | 7/2004 | Fukuhara et al. |
| 6,767,287 | B1 | 7/2004 | Mcquaid et al. |
| 6,773,344 | B1 | 8/2004 | Gabai et al. |
| 6,800,030 | B2 | 10/2004 | Acres |
| 6,805,628 | B2 | 10/2004 | Romero |
| 6,814,664 | B2 | 11/2004 | Baerlocher et al. |
| 6,832,958 | B2 | 12/2004 | Acres et al. |
| 6,835,132 | B2 | 12/2004 | Bennett |
| 6,837,788 | B2 | 1/2005 | Cannon |

| | | | |
|---|---|---|---|
| 6,869,076 | B1 | 3/2005 | Moore et al. |
| 6,876,988 | B2 | 4/2005 | Helsper et al. |
| 6,883,803 | B1 | 4/2005 | Barry |
| 6,887,154 | B1 | 5/2005 | Luciano, Jr. et al. |
| 6,896,614 | B2 | 5/2005 | Romero |
| 6,910,964 | B2 | 6/2005 | Acres |
| RE38,812 | E | 10/2005 | Acres et al. |
| 6,964,608 | B1 | 11/2005 | Koza |
| 6,986,711 | B2 | 1/2006 | Vancura |
| 6,996,413 | B2 | 2/2006 | Inselberg |
| 7,018,292 | B2 | 3/2006 | Tracy et al. |
| 7,036,145 | B1 | 4/2006 | Murphy et al. |
| 7,040,982 | B1 | 5/2006 | Jarvis et al. |
| 7,054,831 | B2 | 5/2006 | Koenig |
| 7,056,215 | B1 | 6/2006 | Olive |
| 7,058,602 | B1 | 6/2006 | La Mura et al. |
| 7,077,746 | B2 | 7/2006 | Torango |
| 7,085,740 | B1 | 8/2006 | Meyers |
| 7,086,945 | B2 | 8/2006 | Vancura |
| 7,107,239 | B2 | 9/2006 | Graff |
| 7,130,820 | B2 | 10/2006 | Song |
| 7,192,350 | B2 | 3/2007 | Nguyen |
| 7,195,560 | B2 | 3/2007 | DeMar et al. |
| 7,200,571 | B1 | 4/2007 | Jenniges et al. |
| 7,207,563 | B2 | 4/2007 | Samberg |
| 2001/0025252 | A1 | 9/2001 | Yoshimoto |
| 2001/0029200 | A1 | 10/2001 | Romero |
| 2001/0030395 | A1 | 10/2001 | Sunday |
| 2001/0034635 | A1 | 10/2001 | Winters |
| 2001/0039206 | A1 | 11/2001 | Peppel |
| 2001/0049625 | A1 | 12/2001 | Mowry |
| 2001/0055990 | A1 | 12/2001 | Acres |
| 2001/0056396 | A1 | 12/2001 | Goino |
| 2002/0002070 | A1 | 1/2002 | Romero |
| 2002/0006820 | A1 | 1/2002 | Romero |
| 2002/0013763 | A1 | 1/2002 | Harris |
| 2002/0028708 | A1 | 3/2002 | Busch et al. |
| 2002/0094869 | A1 | 7/2002 | Harkham |
| 2002/0103746 | A1 | 8/2002 | Moffett |
| 2002/0107074 | A1 | 8/2002 | Lee |
| 2002/0138342 | A1 | 9/2002 | Clark et al. |
| 2002/0138594 | A1 | 9/2002 | Rowe |
| 2002/0142832 | A1 | 10/2002 | Loose et al. |
| 2002/0147045 | A1 | 10/2002 | La Mura et al. |
| 2002/0147046 | A1 | 10/2002 | Wang |
| 2002/0147675 | A1 | 10/2002 | Das et al. |
| 2002/0151342 | A1 | 10/2002 | Joseph et al. |
| 2002/0155870 | A1 | 10/2002 | Romero |
| 2002/0155885 | A1 | 10/2002 | Shvili |
| 2002/0163122 | A1 | 11/2002 | Vancura |
| 2002/0177483 | A1 | 11/2002 | Cannon |
| 2002/0178264 | A1 | 11/2002 | Benda et al. |
| 2002/0183105 | A1 | 12/2002 | Cannon et al. |
| 2003/0018564 | A1 | 1/2003 | Bonnier et al. |
| 2003/0027625 | A1 | 2/2003 | Rowe |
| 2003/0028779 | A1 | 2/2003 | Rowe |
| 2003/0032476 | A1 | 2/2003 | Walker et al. |
| 2003/0032480 | A1 | 2/2003 | Keith |
| 2003/0033607 | A1 | 2/2003 | Schwalb |
| 2003/0036424 | A1 | 2/2003 | Baerlocher |
| 2003/0040363 | A1 | 2/2003 | Sandberg |
| 2003/0045350 | A1 | 3/2003 | Baerlocher et al. |
| 2003/0046221 | A1 | 3/2003 | Hora |
| 2003/0054879 | A1 | 3/2003 | Schneier et al. |
| 2003/0055713 | A1 | 3/2003 | Pinto et al. |
| 2003/0057884 | A1 | 3/2003 | Dowling et al. |
| 2003/0060266 | A1 | 3/2003 | Baerlocher |
| 2003/0060276 | A1 | 3/2003 | Walker et al. |
| 2003/0060279 | A1 | 3/2003 | Torango |
| 2003/0078871 | A1 | 4/2003 | Webb |
| 2003/0092484 | A1 | 5/2003 | Schneider et al. |
| 2003/0119570 | A1 | 6/2003 | Maroun |
| 2003/0144965 | A1 | 7/2003 | Prasad et al. |
| 2003/0159083 | A1 | 8/2003 | Fukuhara et al. |
| 2003/0177347 | A1 | 9/2003 | Schneier et al. |
| 2003/0199313 | A1 | 10/2003 | Gonen et al. |
| 2003/0211880 | A1 | 11/2003 | Locke |
| 2003/0222402 | A1 | 12/2003 | Olive |
| 2003/0225615 | A1 | 12/2003 | Sumiyoshi |
| 2003/0225617 | A1 | 12/2003 | Sumiyoshi |
| 2003/0228904 | A1 | 12/2003 | Acres et al. |
| 2004/0009811 | A1 | 1/2004 | Torango |
| 2004/0009817 | A1 | 1/2004 | La Mura et al. |
| 2004/0010771 | A1 | 1/2004 | Wallace et al. |
| 2004/0010793 | A1 | 1/2004 | Wallace et al. |
| 2004/0039677 | A1 | 2/2004 | Mura et al. |
| 2004/0043770 | A1 | 3/2004 | Amit et al. |
| 2004/0054551 | A1 | 3/2004 | Ausubel et al. |
| 2004/0058731 | A1 | 3/2004 | Rossides |
| 2004/0072615 | A1 | 4/2004 | Maya et al. |
| 2004/0082372 | A1 | 4/2004 | Romero |
| 2004/0083154 | A1 | 4/2004 | Guler et al. |
| 2004/0097287 | A1 | 5/2004 | Postrel |
| 2004/0104530 | A1 | 6/2004 | Moe |
| 2004/0106449 | A1 | 6/2004 | Walker et al. |
| 2004/0110552 | A1 | 6/2004 | Del Prado |
| 2004/0116176 | A1 | 6/2004 | Tulley et al. |
| 2004/0148221 | A1 | 7/2004 | Chu |
| 2004/0180717 | A1 | 9/2004 | Vancura |
| 2004/0192437 | A1 | 9/2004 | Amaitis et al. |
| 2004/0193489 | A1 | 9/2004 | Boyd et al. |
| 2004/0204232 | A1 | 10/2004 | Asher et al. |
| 2004/0215548 | A1 | 10/2004 | Chieu et al. |
| 2004/0224772 | A1 | 11/2004 | Canessa et al. |
| 2004/0229700 | A1 | 11/2004 | Cannon et al. |
| 2004/0242294 | A1 | 12/2004 | Shiozawa |
| 2004/0242297 | A1 | 12/2004 | Walker et al. |
| 2004/0242322 | A1 | 12/2004 | Montagna et al. |
| 2004/0248637 | A1 | 12/2004 | Liebenberg et al. |
| 2004/0260641 | A1 | 12/2004 | Cohen |
| 2004/0267624 | A1 | 12/2004 | Nuriel |
| 2005/0004984 | A1 | 1/2005 | Simpson |
| 2005/0020342 | A1 | 1/2005 | Palmer et al. |
| 2005/0032573 | A1 | 2/2005 | Acres et al. |
| 2005/0041161 | A1 | 2/2005 | Dowling et al. |
| 2005/0043088 | A1 | 2/2005 | Nguygen et al. |
| 2005/0049933 | A1 | 3/2005 | Upendran et al. |
| 2005/0049957 | A1 | 3/2005 | Vakili et al. |
| 2005/0050160 | A1 | 3/2005 | Upendran et al. |
| 2005/0050576 | A1 | 3/2005 | Upendran et al. |
| 2005/0056700 | A1 | 3/2005 | McKinley et al. |
| 2005/0064937 | A1 | 3/2005 | Ballman |
| 2005/0076362 | A1 | 4/2005 | Dukes et al. |
| 2005/0079912 | A1 | 4/2005 | Hanafusa |
| 2005/0085300 | A1 | 4/2005 | Johnson |
| 2005/0091144 | A1 | 4/2005 | Longman et al. |
| 2005/0102215 | A1 | 5/2005 | Ausubel et al. |
| 2005/0119047 | A1 | 6/2005 | Olive |
| 2005/0125309 | A1 | 6/2005 | Song |
| 2005/0143168 | A1 | 6/2005 | Torango |
| 2005/0153767 | A1 | 7/2005 | Gauselmann |
| 2005/0164792 | A1 | 7/2005 | Wilcock |
| 2005/0173054 | A1 | 8/2005 | Peterson |
| 2005/0176488 | A1 | 8/2005 | Olive |
| 2005/0187004 | A1 | 8/2005 | Vancura |
| 2005/0187021 | A1 | 8/2005 | Daskalakis |
| 2005/0187873 | A1 | 8/2005 | Labrou et al. |
| 2005/0202873 | A1 | 9/2005 | Asher et al. |
| 2005/0202874 | A1 | 9/2005 | Asher et al. |
| 2005/0209004 | A1 | 9/2005 | Torango |
| 2005/0216391 | A1 | 9/2005 | Tews |
| 2005/0239542 | A1 | 10/2005 | Olsen |
| 2005/0240318 | A1 | 10/2005 | Naoi et al. |
| 2005/0240558 | A1 | 10/2005 | Gil et al. |
| 2005/0267834 | A1 | 12/2005 | Zetmeir |
| 2005/0269778 | A1 | 12/2005 | Samberg |

2005/0273417 A1 12/2005 Budish
2006/0003829 A1 1/2006 Thomas
2006/0030402 A1 2/2006 Chandrakumar et al.
2006/0035705 A1 2/2006 Jordon
2006/0040723 A1 2/2006 Baerlocher et al.
2006/0040732 A1 2/2006 Baerlocher et al.
2006/0040733 A1 2/2006 Baerlocher et al.
2006/0040734 A1 2/2006 Baerlocher et al.
2006/0040736 A1 2/2006 Baerlocher et al.
2006/0046817 A1 3/2006 Paulsen et al.
2006/0046839 A1 3/2006 Nguyen
2006/0047581 A1 3/2006 La Mura et al.
2006/0063580 A1 3/2006 Nguyen et al.
2006/0064184 A1 3/2006 Ream et al.
2006/0068919 A1 3/2006 Gottfurcht
2006/0079317 A1 4/2006 Flemming et al.
2006/0085261 A1 4/2006 Chu
2006/0085321 A1 4/2006 Staib et al.
2006/0089188 A1 4/2006 Romero
2006/0093142 A1 5/2006 Schneier et al.
2006/0100006 A1 5/2006 Mitchell et al.
2006/0105827 A1 5/2006 Metzger et al.
2006/0111979 A1 5/2006 Chu
2006/0111985 A1 5/2006 Sheldon et al.
2006/0116194 A1 6/2006 Pacey et al.
2006/0121971 A1 6/2006 Slomiany et al.
2006/0123053 A1 6/2006 Scannell
2006/0135260 A1 6/2006 Boss et al.
2006/0138728 A1 6/2006 Gordon et al.
2006/0167784 A1 7/2006 Hoffberg
2006/0178217 A1 8/2006 Jung et al.
2006/0182258 A1 8/2006 Sisselman et al.
2006/0183547 A1 8/2006 McMonigle
2006/0184989 A1 8/2006 Slothouber
2006/0189371 A1 8/2006 Walker et al.
2006/0190392 A1 8/2006 Samid
2006/0195382 A1 8/2006 Sung
2006/0211482 A1 9/2006 Pimienta et al.
2006/0217199 A1 9/2006 Adcox et al.
2006/0221195 A1 10/2006 Sohmers
2006/0223616 A1 10/2006 Tulley et al.
2006/0223617 A1 10/2006 Tulley et al.
2006/0230158 A1 10/2006 Fukazawa et al.
2006/0234795 A1 10/2006 Dhunjishaw et al.
2006/0235745 A1 10/2006 Yano
2006/0246991 A1 11/2006 Tulley et al.
2006/0247040 A1 11/2006 Walker et al.
2006/0247056 A1 11/2006 Luckerson
2006/0252476 A1 11/2006 Bahou
2006/0258429 A1 11/2006 Manning et al.
2006/0259361 A1 11/2006 Barhydt et al.
2006/0259418 A1 11/2006 Feaver
2006/0259957 A1 11/2006 Tam et al.
2006/0270478 A1 11/2006 Barhydt et al.
2006/0277053 A1 12/2006 Lobb et al.
2006/0287041 A1 12/2006 Walker et al.
2006/0287924 A1 12/2006 Admon
2006/0293994 A1 12/2006 Stuart
2007/0004509 A1 1/2007 Banton
2007/0004517 A1 1/2007 Mahajan
2007/0004519 A1 1/2007 Swart et al.
2007/0010314 A1 1/2007 Tulley et al.
2007/0021168 A1 1/2007 Chamizer et al.
2007/0021176 A1 1/2007 Jackson
2007/0026928 A1 2/2007 Tulley et al.
2007/0026929 A1 2/2007 Tulley et al.
2007/0032286 A1 2/2007 Muir
2007/0050281 A1 3/2007 Hoffman
2007/0054718 A1 3/2007 Del Prado
2007/0055606 A1 3/2007 Ausubel et al.
2007/0060276 A1 3/2007 Monahan
2007/0060380 A1 3/2007 McMonigle et al.
2007/0063433 A1 3/2007 Ross
2007/0072678 A1 3/2007 Dagres
2007/0077981 A1 4/2007 Hungate et al.
2007/0077990 A1* 4/2007 Cuddy et al. .................. 463/25
2007/0077997 A1 4/2007 Johnson
2007/0087816 A1 4/2007 VanLuchene
2007/0087820 A1 4/2007 Van Luchene et al.
2007/0087822 A1 4/2007 Van Luchene
2007/0087833 A1 4/2007 Feeney et al.
2007/0087835 A1 4/2007 Van Luchene
2007/0099685 A1 5/2007 Van Luchene
2007/0105612 A1 5/2007 Fotevski
2007/0105619 A1* 5/2007 Kniesteadt et al. ............ 463/26
2007/0105620 A1* 5/2007 Cuddy et al. .................. 463/26
2007/0111770 A1 5/2007 Van Luchene
2007/0111784 A1 5/2007 Van Luchene
2007/0111789 A1 5/2007 Van Deursen et al.
2007/0117601 A1 5/2007 Van Luchene
2007/0118432 A1 5/2007 Vazirani et al.
2007/0129124 A1 6/2007 Van Luchene
2007/0129125 A1 6/2007 Van Luchene
2007/0129139 A1 6/2007 Nguyen et al.
2007/0129148 A1 6/2007 Van Luchene
2008/0020822 A1* 1/2008 Cuddy et al. .................. 463/25
2008/0020823 A1* 1/2008 Cuddy et al. .................. 463/25
2008/0020824 A1* 1/2008 Cuddy et al. .................. 463/25
2008/0020825 A1* 1/2008 Cuddy et al. .................. 463/25

FOREIGN PATENT DOCUMENTS

EP 1063622 12/2000
EP 1175928 1/2002
EP 1292898 3/2002
EP 1208412 5/2002
EP 1234606 8/2002
EP 1288817 3/2003
EP 1298609 4/2003
EP 1306788 5/2003
EP 1346305 9/2003
EP 1381953 1/2004
WO WO80/01356 7/1980
WO WO 99/12135 3/1999
WO WO 00/32286 6/2000
WO WO 02/097582 12/2002
WO WO 03/026757 4/2003
WO WO 03/032217 4/2003
WO WO 03/049054 6/2003
WO WO 2005/015826 2/2005
WO WO 2005/075037 8/2005

OTHER PUBLICATIONS

"Auction," [online] [printed on Apr. 27, 2007]. Retrieved from the Internet at <URL: http://en.wikipedia.org/wiki/Auction>.
Bally Slot Machines Electro-Mechanicals 1964-1980 Book [In Part], Revised 3rd Edition written by Marshall Fey.
Winning Bid™ Brochure, written by WMS Gaming, Inc., available prior to Nov. 1, 2006.

* cited by examiner

FIG. 5

| Time (s) | Player | Bid |
|---|---|---|
| 0 | A | 1 |
| 3 | B | 5 |
| 5 | A | 10 |
| 7 | C | 20 |
| 9 | A | 30 |
| 14 | B | 40 |
| 18 | A | 45 |
| 24 | C | 55 |
| 26 | B | 65 |
| 27 | A | 80 |
| 29 | C | 95 |
| 30 | B | 100 |

FIG. 6

| Section | Value | Times | Probability | Contribution |
|---|---|---|---|---|
| 1 | 100 | 1 | 0.05000 | 5.00000 |
| 2 | 250 | 1 | 0.05000 | 12.50000 |
| 3 | 750 | 1 | 0.05000 | 37.50000 |
| 4 | 400 | 1 | 0.05000 | 20.00000 |
| 5 | 200 | 1 | 0.05000 | 10.00000 |
| 6 | 50 | 1 | 0.05000 | 2.50000 |
| 7 | 125 | 1 | 0.05000 | 6.25000 |
| 8 | 600 | 1 | 0.05000 | 30.00000 |
| 9 | 300 | 1 | 0.05000 | 15.00000 |
| 10 | 175 | 1 | 0.05000 | 8.75000 |
| 11 | 500 | 1 | 0.05000 | 25.50000 |
| 12 | 400 | 1 | 0.05000 | 20.00000 |
| 13 | 750 | 1 | 0.05000 | 37.50000 |
| 14 | 500 | 1 | 0.05000 | 25.00000 |
| 15 | 250 | 1 | 0.05000 | 12.50000 |
| 16 | 650 | 1 | 0.05000 | 32.50000 |
| 17 | 150 | 1 | 0.05000 | 7.50000 |
| 18 | 350 | 1 | 0.05000 | 17.50000 |
| 19 | 500 | 1 | 0.05000 | 25.00000 |
| 20 | 1000 | 1 | 0.05000 | 50.00000 |
| | | 20 | | 400.00000 |

FIG. 7

| Section | Value | Times | Probability | Contribution |
|---|---|---|---|---|
| 1 | 100 | 20 | 0.06689 | 6.68896 |
| 2 | 250 | 15 | 0.05017 | 12.54181 |
| 3 | 750 | 8 | 0.02676 | 20.06689 |
| 4 | 400 | 25 | 0.08361 | 33.44482 |
| 5 | 200 | 22 | 0.07358 | 14.71572 |
| 6 | 1500 | 6 | 0.02007 | 30.10033 |
| 7 | 125 | 25 | 0.08361 | 10.45151 |
| 8 | 600 | 15 | 0.05017 | 30.10033 |
| 9 | 300 | 18 | 0.06020 | 18.06020 |
| 10 | 175 | 23 | 0.07692 | 13.46154 |
| 11 | 2500 | 3 | 0.01003 | 25.08361 |
| 12 | 400 | 18 | 0.06020 | 24.08027 |
| 13 | 750 | 11 | 0.03679 | 27.59197 |
| 14 | 500 | 11 | 0.03679 | 18.39465 |
| 15 | 250 | 19 | 0.06355 | 15.88629 |
| 16 | 5000 | 1 | 0.00334 | 16.72241 |
| 17 | 150 | 15 | 0.05017 | 7.52508 |
| 18 | 350 | 20 | 0.06689 | 23.41137 |
| 19 | 500 | 17 | 0.05686 | 28.42809 |
| 20 | 1000 | 7 | 0.02341 | 23.41137 |
| | | 299 | | 400.16722 |

GAMING SYSTEM AND METHOD OF OPERATING A GAMING SYSTEM HAVING A BONUS PARTICIPATION BIDDING SEQUENCE

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one penny, nickel, dime, quarter or dollar) up to a maximum number of credits, such as five credits. This wager may be made by the player a single time or multiple times in a single play of a primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Certain secondary or bonus games include a group gaming aspect wherein a plurality of players playing at linked or related gaming devices participate in a group event for one or more bonus events or awards. There is a continuing need to provide new and different linked or related gaming machines. There is also a continuing need to provide new and different gaming devices and gaming systems which allow players to have further control over their bonus events and awards.

SUMMARY

The present disclosure relates to gaming systems and methods of operating gaming systems which provide a bidding sequence wherein players compete against one another for the opportunity to participate in a bonus event.

One embodiment of the present disclosure provides a gaming system including a central server, central controller, or remote host in communication with or linked to a plurality of gaming machines or gaming devices which form a group. In operation, the controller or central server monitors wagers placed on the primary games of the gaming devices. In one embodiment, based at least in part on the wagers placed on the primary games of the gaming devices, the controller or central server determines when a bidding sequence is triggered. In one embodiment, the bidding sequence is triggered when an amount in an accumulated value pool meets or exceeds an average expected value of the bonus event. Once the bidding sequence is triggered, the controller or central server enables each player playing at a gaming device in the group to place one or more bids on the opportunity to participate in the bonus event. Once the bidding sequence is complete, the central controller identifies the player who is the winning bidder (i.e., the player who placed the winning bid in the bidding sequence) and accepts payment from that player to fund the winning bid. The winning bidder participates in the bonus event and is provided with any award resulting from the bonus event, wherein the provided award may be higher than, lower than, or equal to the winning bid.

In one embodiment, each of the linked gaming devices in the group includes a primary game operable upon a wager placed by a player. Each gaming device may have one or a plurality of different primary games. The primary games of each gaming device may be the same games or different games.

In one embodiment, the central controller tracks the total or partial coin-in or wagers placed on the primary games for each of the gaming devices in the gaming system. As players play the gaming devices, a percentage or portion of each wager placed to play the primary game is dedicated to the accumulated value pool associated with the group of gaming devices. In one embodiment, the central server determines when a bidding sequence will occur based, at least in part, on the accumulated amount in the accumulated value pool. In one such embodiment, the bidding sequence is triggered when the accumulated value pool is sufficiently funded to meet the average expected payout of the bonus event.

In one embodiment, the accumulated value pool accumulates based on player coin-in or amounts wagered on the plays of the primary games of the gaming machines in the gaming system. In another embodiment, the accumulated value pool accumulates in coin-in chunks. In one such embodiment, a coin-in chunk is a total amount of coin-in from the end of a first time interval to the end of a second time interval. In another embodiment, a coin-in chunk is an amount of coin-in. For each collected coin-in chunk, the amount of coin-in associated with the collected coin-in chunk is added to the accumulated value pool.

In other embodiments, the accumulated value pool includes any unaccounted for portions of the amounts in one or more previous accumulated value pools from one or more previous bonus event(s). This is sometimes referred to herein as a remainder, as discussed in more detail below. In another embodiment, the accumulated value pool includes winning bids or portions of winning bids from previous bidding sequences. In one such embodiment, a winning bid or portion of that bid is refunded back to the accumulated value pool to help fund the next bonus event, as will also be discussed in more detail below. It should be appreciated that the accumulated value pool may accumulate in any other suitable manner, or any combination of the above ways.

In one embodiment, as described above, the central server determines when a bidding sequence will occur based, at least in part, on the accumulated amount in the accumulated value pool. In one such embodiment, the bidding sequence is triggered when the accumulated value pool is sufficiently funded to meet the average expected payout of the bonus event. In one embodiment, the central controller determines a target value based on the average expected payout of the bonus event. The target value is calculated and adjusted based on the type of bonus event and the average expected payout associated with the bonus event. That is, if one or more aspects of the bonus event changes, such as the number of possible awards in the bonus event, the target value may change accordingly. When the accumulated value pool associated with the group of gaming devices is at or above the determined target value, the central controller causes the triggering of the bidding sequence.

In one example embodiment, the bonus event includes a wheel having a plurality of sections. Each of the sections is associated with one or more awards. The average expected payout of the wheel is based on the awards associated with the wheel. One or more section indicators are associated with the wheel, and each indicator indicates one of the sections on the wheel after that wheel has been activated or spun. In one embodiment, each of the sections has the same or substantially the same probability of being indicated after the wheel has been activated. In an alternative embodiment, each of the sections or a plurality of the sections of the wheel are weighted differently to yield a desired average expected payout for that wheel.

In this example embodiment, the central controller determines the target value for the accumulated value pool based on the average expected payout of the wheel. In one embodiment, the target value required to trigger the bidding sequence is equal to the average expected payout of the wheel associated with the bonus event. For example, if the average expected payout of the wheel is 400, the accumulated value pool must meet or exceed a target value of 400 to trigger the bidding sequence.

Once the accumulated value pool meets or exceeds the required target value, the central controller triggers the bidding sequence wherein players compete against one another for the opportunity to participate in the bonus event. In other words, the central controller enables the players playing at a gaming device to place one or more bids on the opportunity to participate in the bonus event. In one embodiment, if not enough players are playing at the gaming devices, a player bids against the gaming machine during the bidding sequence rather than competing against other players. In one such embodiment, the player must bid above a designated level or threshold to win the opportunity to participate in the bonus event. In one embodiment, the designated level or threshold may be predetermined, randomly determined, or determined in any other suitable manner.

In one embodiment, there is minimum bid amount that a player can bid in the bidding sequence (e.g., all bids must have a value of at least 10 monetary units). In one embodiment, there is a maximum amount that a player can bid. That is, each player can bid up to a limited amount. In one such embodiment, the amount that a player has wagered on the primary game has an impact on the maximum bid amount that that player can bid up to. In other embodiments, the amount that a player can bid up to is randomly determined, predetermined, or determined in any other suitable manner.

In certain embodiments, the bonus event that the players are bidding on is a game event, such as a progressive, a bonus game, a free spin, a free game, or any other suitable type of game event. In one embodiment, the bonus event includes a wheel associated with one or a plurality of indicators. In such embodiments, the players involved in the bidding sequence are bidding on one or more of the indicators associated with the wheel. In an alternative embodiment, rather than bidding on the opportunity to participate in the bonus event, players are bidding on a multiplier which is applied to the bonus event. In one embodiment, the players are playing the same or different bonuses to which the multiplier is applied. The bonus event may be randomly determined, predetermined, or determined in any other suitable manner by an implementer or designer of the gaming system.

In one embodiment, the highest bid placed during the bidding sequence is the winning bid. In this embodiment, the player that places the highest bid wins the opportunity to participate in the bonus event. Alternatively, multiple players can win the bidding sequence. For example, the top 3 bidders win the opportunity to participate in the bonus event.

It should be appreciated that, during the bidding sequence, the players are bidding below what they think the bonus event is worth. Thus, the player's feel as though they are getting value for their money. However, the bonus event may result in a bonus award that is equal to, higher than, or lower than the winning bid. This adds an element of risk to the bidding sequence of the present disclosure.

In various alternative embodiments, once the central controller determines which player or players have placed winning bids, the winning bid can be funded from a credit meter, from a player's loyalty points, from a cash-in placed after the bid, or debited from a player's account, charged to a credit card, or any other suitable form of payment. In certain embodiments, one or more of these payment methods could be applied simultaneously or substantially simultaneously to fund the winning bid. If cash-in after the bid is the form of payment used to fund the winning bid, in one embodiment, appropriate time restrictions apply that award the bonus opportunity to the runner up in the bidding sequence (i.e., the player who placed the second highest bid) if the player who placed the winning bid does not make payment within the time window.

In one embodiment, a player can use bidding credits to fund the bid. In one such embodiment, bidding credits are accumulated based on events that occur during primary game play. In different embodiments, bidding credits are awarded to the player based on symbol driven events, player coin in, time of play, player status, any other suitable aspect, or any combination of the above. For example, in one embodiment, bidding credits are awarded for obtaining designated symbol combinations during play of the primary game.

It should be appreciated that, in one such embodiment, players may not use bidding credits to place wagers on a play of the primary game. Rather, bidding credits are used to fund winning bids from a bidding sequence. If a high bidder uses bidding credits to fund the bid, that player participates in the bonus event at no cost. In one embodiment, bidding credits are stored on the gaming device. In one such embodiment, any bidding credits accumulated through playing the primary game are lost if the player playing at that gaming device does not use the accumulated bidding credits to fund a bid. In another embodiment, bidding credits are stored on a player tracking card.

The bidding sequence of the present disclosure can be applied in several different embodiments. In one embodiment where the bonus event includes a wheel, the wheel is associated with a plurality of indicators. In this embodiment, when the bidding sequence is triggered, the central controller provides each of the players playing at a gaming device the opportunity to bid on one or more of the indicators. In this embodiment, to trigger the bidding sequence, the accumulated value pool associated with the group of gaming devices must be sufficient to fund an average expected value for each available indicator. For example, if the average expected payout for the wheel is 400 and the wheel has three available indicators, the accumulated value pool must achieve a target value of 1200 (i.e., 400×3) to trigger the bidding sequence. In one such embodiment, once the bidding sequence is triggered, each of the indicators has a separate bid associated with it. Thus, one player may bid on and win all of the indicators associated with the wheel. Alternatively, different players may each bid on and win a different indicator associated with the wheel.

In one embodiment, each of the players playing at a gaming device qualifies to participate in the bonus event. In other words, each of the players participates in bonus event, regardless of which player places the winning bid in the bidding sequence. However, this embodiment, when the bidding sequence is triggered, the controller enables the players to bid against one another for a multiplier to be applied to the bonus event. In this embodiment, each player participates in the bonus event, but the player who places the winning bid during the bidding sequence wins the multiplier for the bonus event.

In one embodiment, the players bid on a plurality of different multipliers. In one such embodiment, the winning bidder receives the highest multiplier, and players who placed lower bids receive lower multipliers corresponding to the value of their bids.

In another embodiment, each of the players participates in the bonus event and gets a multiplier for the bonus event regardless of which player places the winning bid in the bidding sequence. In this embodiment, each player is bidding on the opportunity to enhance the multiplier by winning one or more additional multipliers via the bidding sequence. In one such embodiment, the winning bidder in the bidding sequence wins an additional multiplier for the bonus event based on the winning bid. In another embodiment, the winning bidder wins an additional multiplier if the winning bid is at or above a threshold amount. In another embodiment, the winning bidder wins an additional multiplier based on that winning bidder's wager level.

In other embodiments, the players bid on both the opportunity to participate in the bonus event and on one or more multipliers for the bonus event. It should be appreciated that the gaming system may include any combination of the above embodiments.

In certain multiplier embodiments, in order to trigger the bidding sequence, the accumulated value pool associated with the group of gaming devices must be sufficient to fund the multiplier of the average expected payout of the bonus event.

In another embodiment, the central controller determines which system gaming machine(s) will provide the bidding sequence and designates the players of these gaming machines as eligible players. Such a determination is based in part on the individual status of each of the gaming machines in the gaming system. That is, the individual status of each gaming machine determines whether the player of that gaming machine is eligible to participate in the bidding sequence. In one embodiment, each gaming machine is determined to be in either active status or enrolled status. Active status means that the gaming machine is being actively played by a player during a certain time period, such as a bonus event qualification period. Active status requirements can be based on any suitable number of satisfied criteria or defined in any suitable manner by the implementer of the gaming system disclosed herein. For instance, the existence of a playing tracking card in the gaming machine may be part of the determination of whether that gaming machine is in the active status. Other factors such as: (a) the amount of time between each play of or wager on the primary game of the gaming machine; (b) the amount being wagered on the primary game(s); (c) the number of plays within a period of time; (d) the existence of credits on the gaming machine; and (e) a play of or a wager on the primary game of the gaming machine within a predetermined period of time may also or alternatively be part of the determination of whether a gaming machine is in the active status. Enrolled status means that the gaming machine is one of the gaming machines in the gaming system, but is not being actively played by a player according to one or more of the predetermined criteria during the certain time period.

It is therefore an advantage of the present disclosure to provide a gaming system that allows players further control over winning bonus events and awards.

Another advantage of the present disclosure is to provide a bidding sequence wherein players compete against each other for bonus events and awards.

A further advantage of the present disclosure to designate certain triggering events that cause a bidding sequence to be provided to players at gaming devices in a group of linked gaming devices.

Additional features and advantages of the disclosed embodiments are described in, and will be apparent from, the following Detailed Description of the Invention and the Figures.

BRIEF DESCRIPTION OF THE FIGURES

FIG. 5 is a table illustrating the bidding sequence in one embodiment of the gaming system disclosed herein, wherein the players participating in the bidding sequence are provided with a limited amount of time to place their bids.

FIG. 6 is a table representing a wheel with a plurality of sections, wherein each section of the wheel has an equal probability of being indicated after the wheel has been activated or spun.

FIG. 7 is a table representing a wheel with a plurality of sections, wherein a plurality of the sections of the wheel have different probabilities of being indicated after the wheel has been activated or spun.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
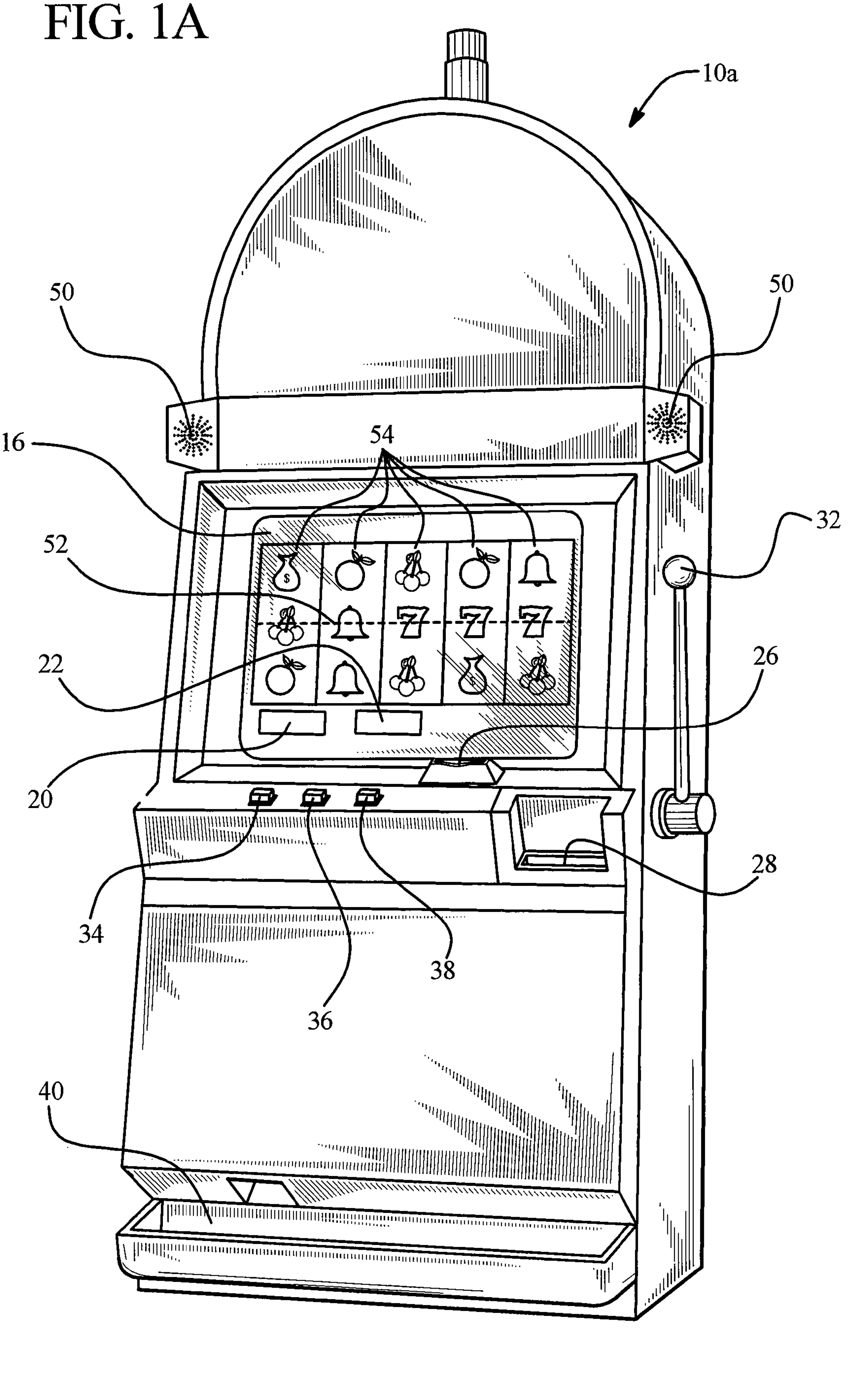
FIG. 1A is a front-side perspective view of one embodiment of the gaming device disclosed herein.
Figure 1B:
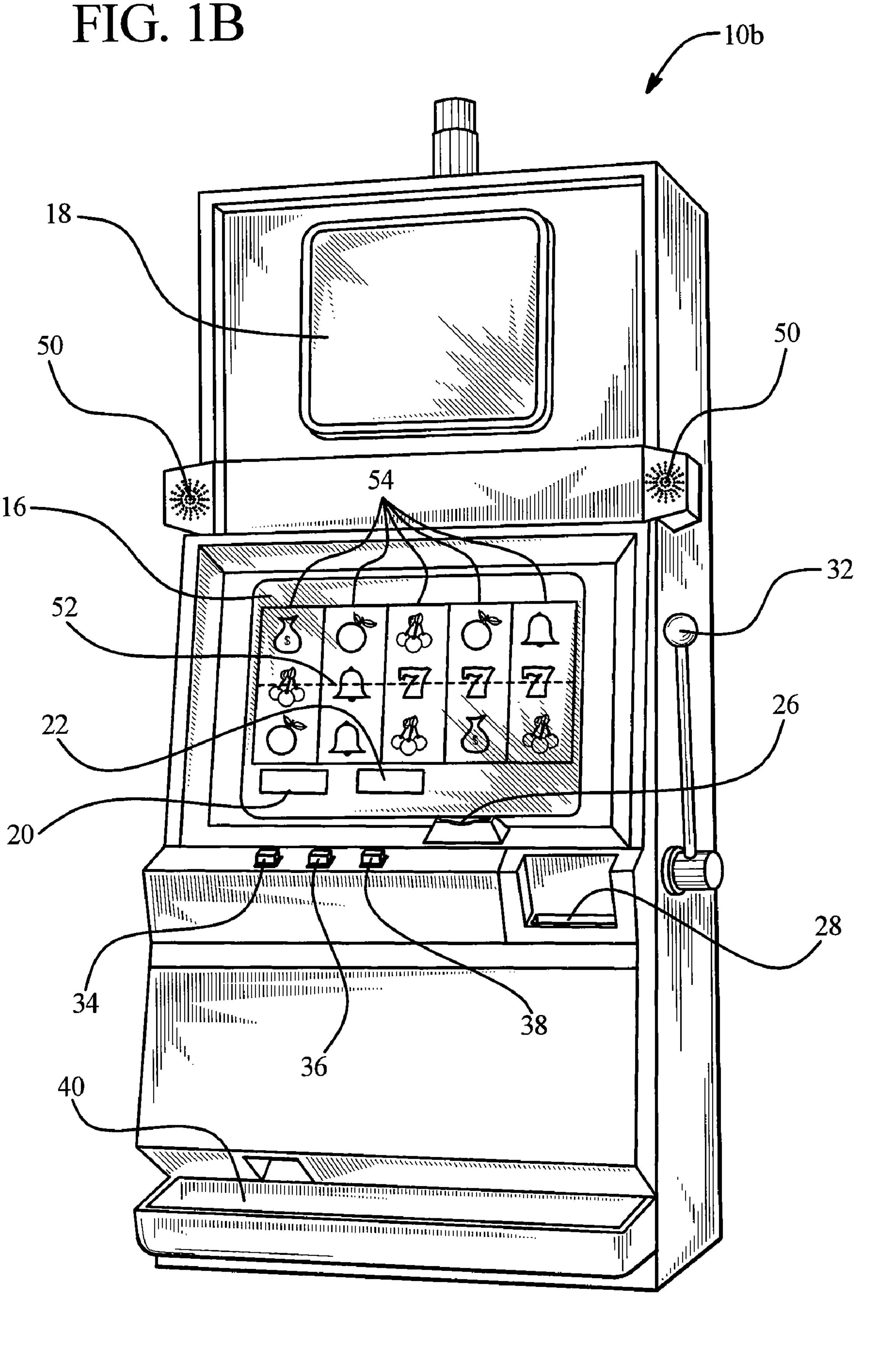
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
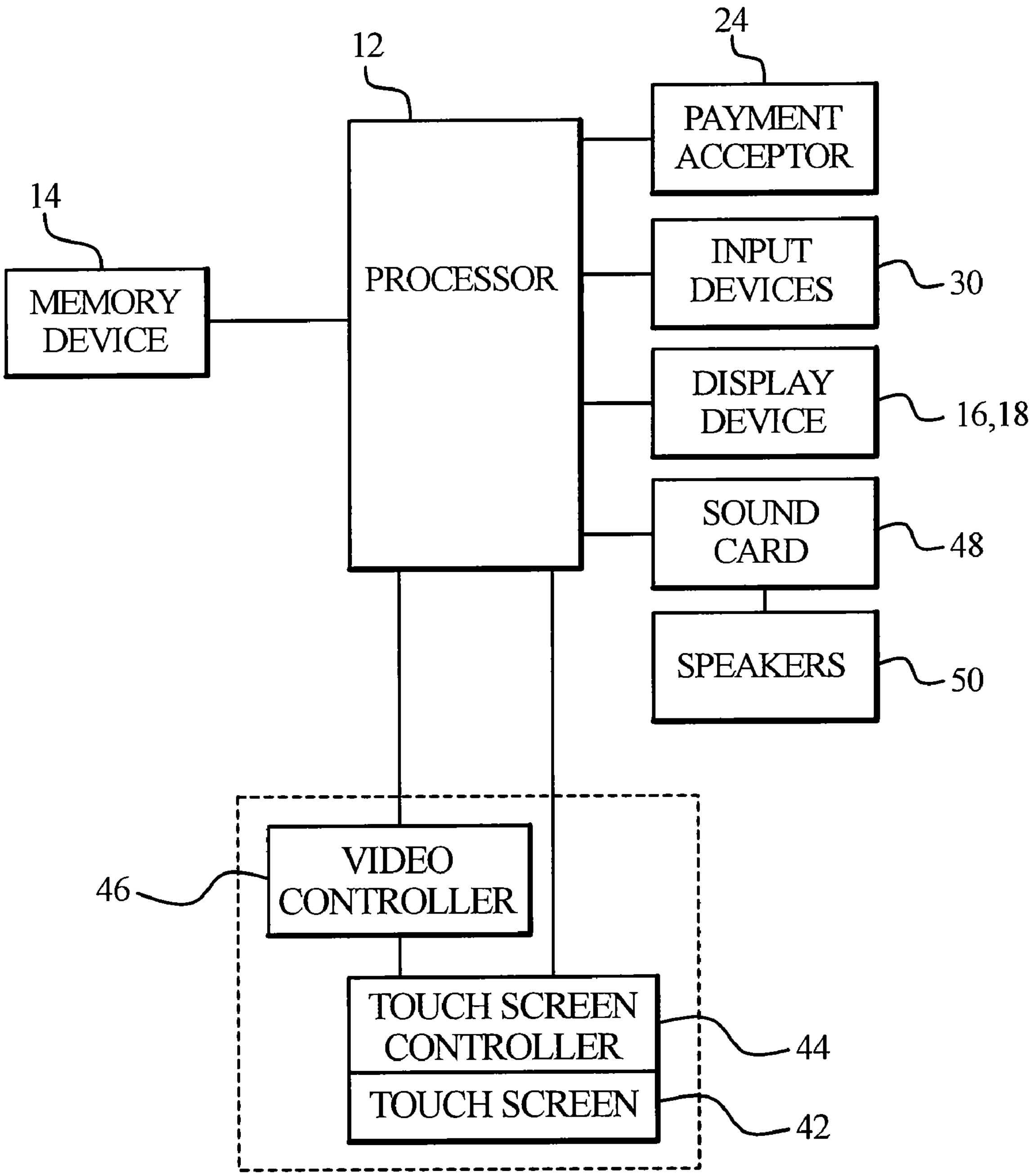
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

Figure 2B:
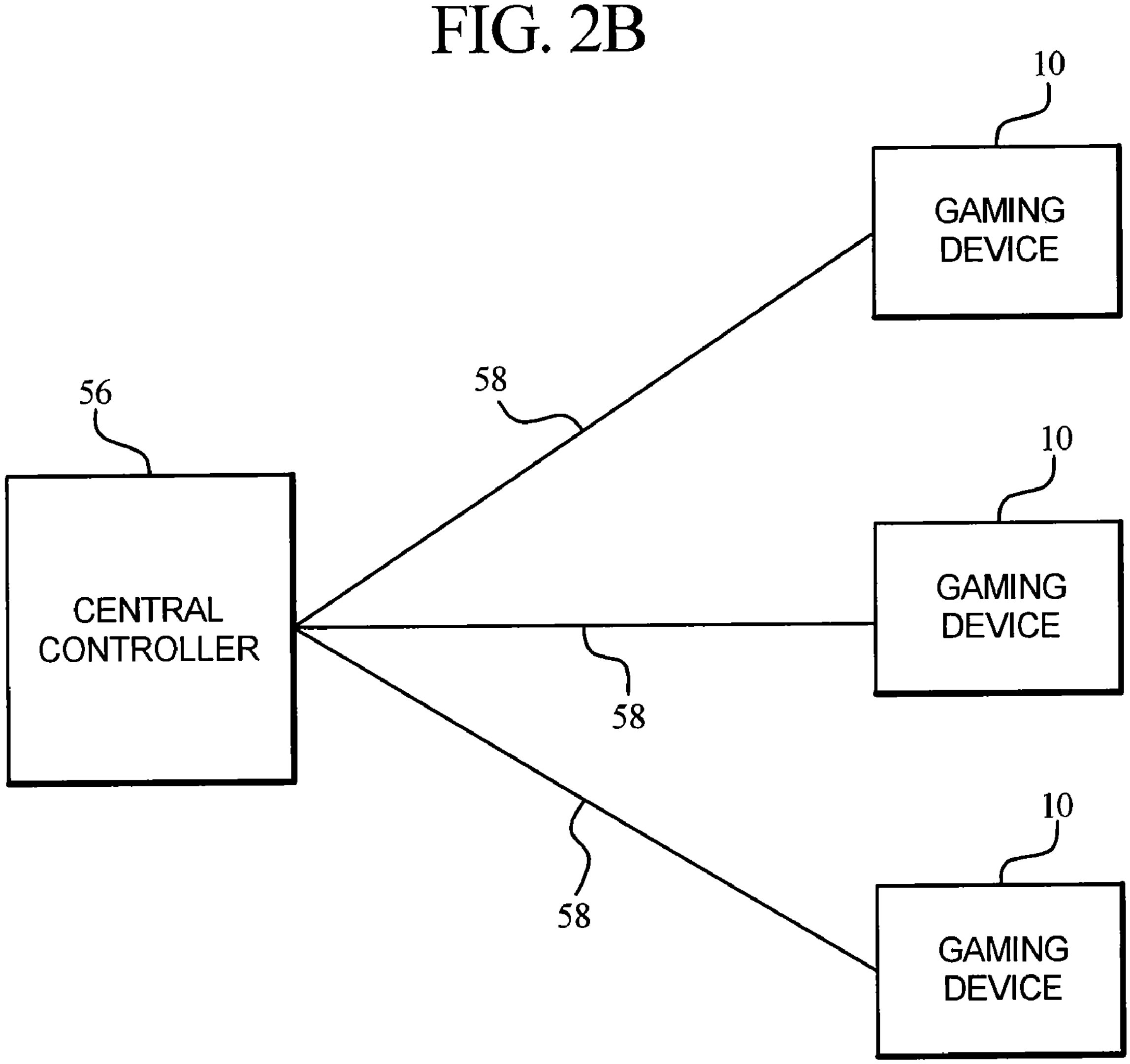
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Bidding Sequence

Figure 3:
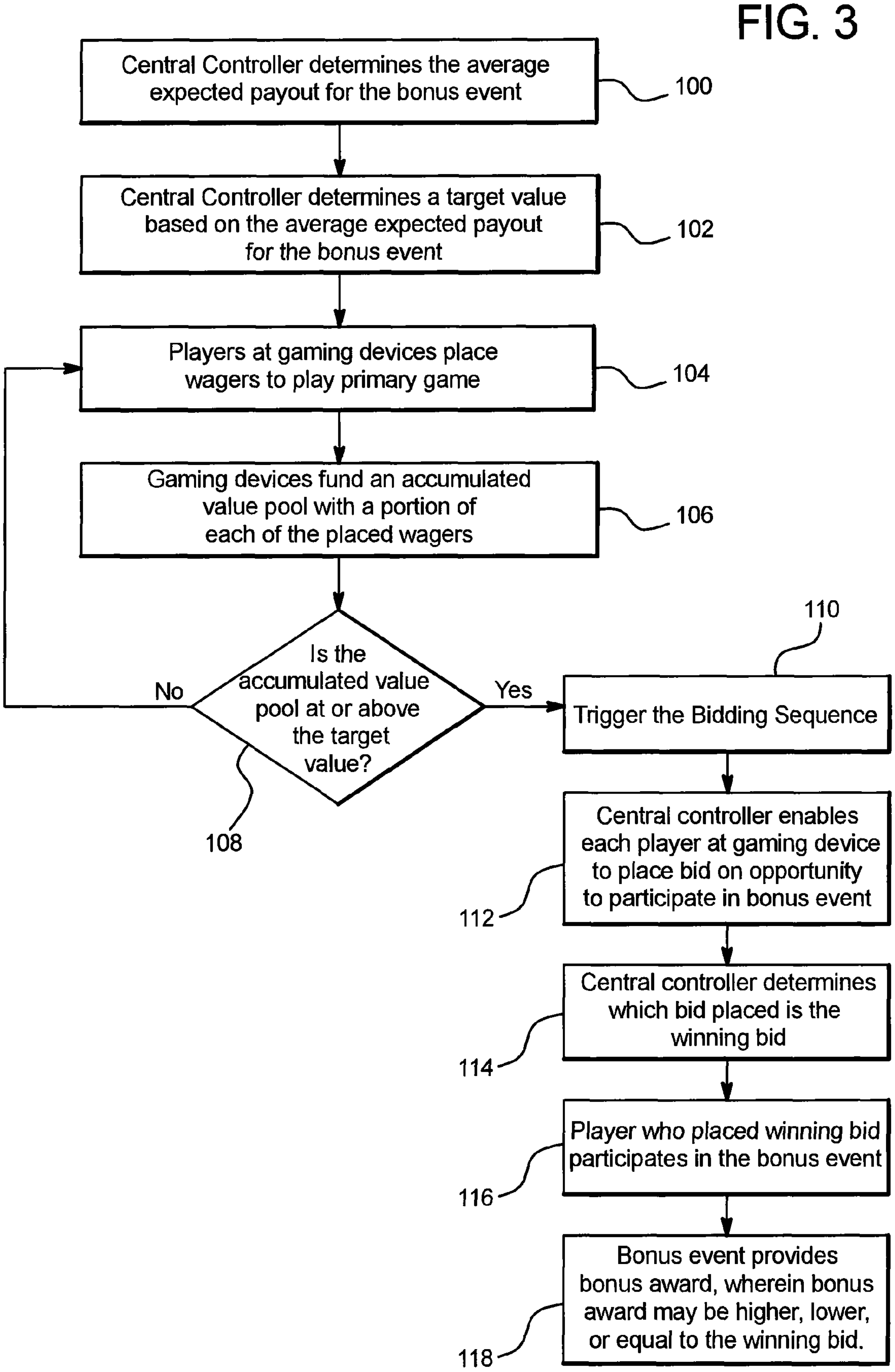
FIG. 3 is a flowchart of one embodiment of the gaming system including the bidding sequence disclosed herein.

Referring now to FIG. 3, in one embodiment, the gaming system/method of operating a gaming system of the present disclosure provides a bidding sequence wherein players bid on an opportunity to participate in a bonus event. In one embodiment, the gaming system includes a central server, central controller, or remote host in communication with or linked to a plurality of gaming machines or gaming devices which form a group. Another embodiment of the present disclosure provides a gaming system having a plurality of linked gaming devices where one of the gaming devices functions as the central server or controller. It should be appreciated that the gaming system can link any suitable number of gaming devices, which can be linked locally, across an entire casino, across multiple casinos, across an internet, an entire country, a state, and multi-nationally. The terms central server, central controller, and remote host, and the terms gaming machine, gaming device, and gaming terminal are used interchangeably herein.

In one embodiment, as illustrated by block 100 of FIG. 3, the central controller determines an average expected payout for a bonus event. For example, in one embodiment, the bonus event includes a wheel having a plurality of sections, wherein each of the sections is associated with one or more awards. The average expected payout of the wheel is based on the awards associated with that wheel. In one such embodiment, the wheel is a mechanical wheel attached to the gaming device cabinet and the processor of the gaming device causes the wheel to physically spin. In another embodiment, the wheel is in video format displayed by a video display device of the gaming device. It should be appreciated that the wheel may include any suitable number of sections and the sections may be any suitable size or shape.

In one embodiment, one or more section indicators are associated with the wheel and each indicator indicates one of the sections on the wheel after that wheel has been activated or spun. In one such embodiment, each of the sections of the wheel has the same or substantially the same probability of being indicated by one of the indicators after the wheel has been activated.

As illustrated in FIG. 6, the table represents a wheel in one example embodiment which includes 20 sections. Each of the sections is associated with an award value and a probability of being indicated. In the example of FIG. 6, each of the sections has the same probability of being indicated in a spin of the wheel. More specifically, each of the sections has a $1/20$ or 0.05 probability of being indicated. The average expected payout of the wheel is determined based on the award values and the probabilities of being indicated associated with the sections of the wheel. For example, section 6 is associated with an award value of 50 and a 0.05 probability of being indicated. Therefore, section 6 makes a contribution of 2.5 to the average expected payout for the wheel. The sum of all of the contributions made by each section to the average expected payout equals the average expected payout for the wheel. In this case, the average expected payout is 400.

In another embodiment, the bonus event includes a wheel, wherein each of the sections of the wheel is weighted differently to yield a certain average expected payout for the wheel. That is, each section or a plurality of the sections on the wheel has a different probability of being indicated by one of the indicators associated with the wheel after the wheel is activated or spun.

As seen in FIG. 7, the table represents a wheel in another example embodiment which includes 20 sections. Each section is associated with an award value and a probability of being indicated, but a plurality of the sections of the wheel have a different probability of being indicated. For example, section 1 is associated with an award value of 100 and a 0.06689 probability of being indicated. Section 16 has an associated award value of 5000 and a 0.00334 probability of being indicated. The award value and the probability of being indicated associated with each section determine the contribution that that section makes to the average expected payout for the wheel. Thus, section 1 makes a contribution of 6.66896 to the average expected payout of the wheel, and section 16 makes a contribution of 16.72241 to the average expected payout of the wheel. The sum of all of the contributions made by each section to the average expected payout is the average expected payout for the wheel. Accordingly, the average expected payout of the wheel represented by the table of FIG. 7 is approximately 400.

After determining the average expected payout of the bonus event, the central controller determines a target value at which the central controller triggers the bidding sequence, as illustrated by block 102 of FIG. 3. In one embodiment, the target value is determined based on the average expected payout associated with the bonus event. In one embodiment, the target value is calculated and adjusted based on the type of bonus event and the average expected payout associated with that bonus event. In different embodiments, the target value at which the central controller triggers the bidding sequence is predetermined, randomly determined, determined based on the wagers placed in the gaming system, determined based on the status of one or more players (such as determined through a player tracking system), determined based on time, or determined based on any other suitable method.

In one embodiment, the central controller maintains an accumulated value pool for the gaming devices in the group. In certain embodiments, the accumulated value pool funds all or a portion of the bonus event. In one embodiment where the bonus event is funded entirely by the accumulated value pool, the target value is equal to the average expected payout of the bonus event. That is, the accumulated value pool must be sufficiently funded to cover the average expected payout of the bonus event. In one embodiment where the bonus event is funded by the accumulated value pool and the bid from the bidding sequence, the target value is equal to the average expected payout of the bonus event, minus the average or minimum bid, as will be discussed in more detail below.

Once a target value is determined, players at each of the gaming devices place wagers to play a base or primary game, as illustrated by block 104 of FIG. 3. In one embodiment, each of the gaming devices of the gaming system includes a base or primary wagering game, such as any of the primary wagering games discussed above. It should be appreciated that each of the gaming devices in the group may play the same primary game, or the primary games could be different. In one embodiment, as the players place wagers to play the primary games, the gaming devices fund the accumulated value pool, as indicated by block 106 of FIG. 3.

In one embodiment, the accumulated value pool associated with the group of gaming devices is funded using all or a portion of player coin-in or the amount wagered to play the primary games at the gaming devices. It should be appreciated that, in one embodiment, even if the gaming devices play different primary games, each gaming device contributes the same proportion of the primary game wager, regardless of which type of primary game is played, so that each gaming device contributes the same percentage amount to the accumulated value pool.

Alternatively, the amount or portion of the wager allocated to the accumulated value pool from each gaming device varies based on other factors, such as the status of the player playing at that gaming device. In one such embodiment, different players of different player statuses have different portions of their placed wagers contributed to the accumulated value pool. For example, a bronze level player may have 7% of their placed wagers allocated to the accumulated value pool and a gold level player may have 5% of their placed wagers allocated to the accumulated value pool.

In one embodiment, the accumulated value pool accumulates through coin-in chunks. In one embodiment, a coin-in chunk is a total amount of coin-in from the end of a first time interval to the end of a second time interval. In another embodiment, a coin-in chunk is an amount of coin-in. For each collected coin-in chunk, the amount of coin-in associated with the collected coin-in chunk is added to the accumulated value pool.

In one embodiment, the gaming system utilizes player tracking cards of a player tracking system to organize one or more player's coin-in into the appropriate coin-in chunks. In another embodiment, the gaming system utilizes a one or more processors to track the amount of coin-in at one or more gaming machines in the gaming system. In one such embodiment, the gaming system utilizes one or more sub-controllers to track the amount of coin-in. In this embodiment, each sub-controller is associated with a plurality of gaming devices and each sub-controller collects coin-in data from its associated gaming devices. This coin-in data is classified or organized into one or more coin-in chunks.

In one embodiment, when a sub-controller creates a complete chunk of coin-in (e.g., either after the end of a designated time interval or when a designated amount of coins-in have been accumulated), the sub-controller communicates the created chunk of coin-in to the central controller. For example, for every 1000 monetary units of coin-in, a first sub-controller will create a coin-in chunk and communicate the created coin-in chunk to the central controller. In another example, every 30 seconds, a second sub-controller will create a coin-in chunk of all the monetary units wagered at the gaming devices associated with the second sub-controller during the previous 30 second time interval and communicate that created coin-in chunk to the central controller.

In these embodiments, the gaming system collects coin-in chunks over different intervals from either the individual gaming machines, one or more sub-controllers or one or more player-tracking cards (which are each individually associated with a player). In one such embodiment, gaming machines are associated with sub-controllers based on one or more factors including, but not limited to, the denomination of the gaming machine, the type of gaming machine, the location of the gaming machine, the manufacturer of the gaming machine, the player currently playing the gaming machine, a designated time period associated with the gaming machine or any other suitable factor. For each collected chunk, the gaming system tracks which gaming machines (or players) contributed to the coin-in chunk and the amount of coin-in contributed by each gaming machine (or player).

In one embodiment, the central server tracks amounts wagered during each accumulation period. In one embodiment, an accumulation period starts at the occurrence of a bidding sequence and ends at the occurrence of a next or subsequent bidding sequence. For example, when a bidding sequence is triggered, the accumulation of amounts wagered for that bidding sequence immediately ceases, the wagered amounts are stored or set, the accumulated value pool is reset, and all further coin-in or wagers on the linked gaming machines which subsequently occur are accumulated for triggering the next bidding sequence. It should be appreciated that the exact period of time of the accumulation period will vary based on many factors, such as the rate of coin-in or wagered monetary units.

Figure 8A:
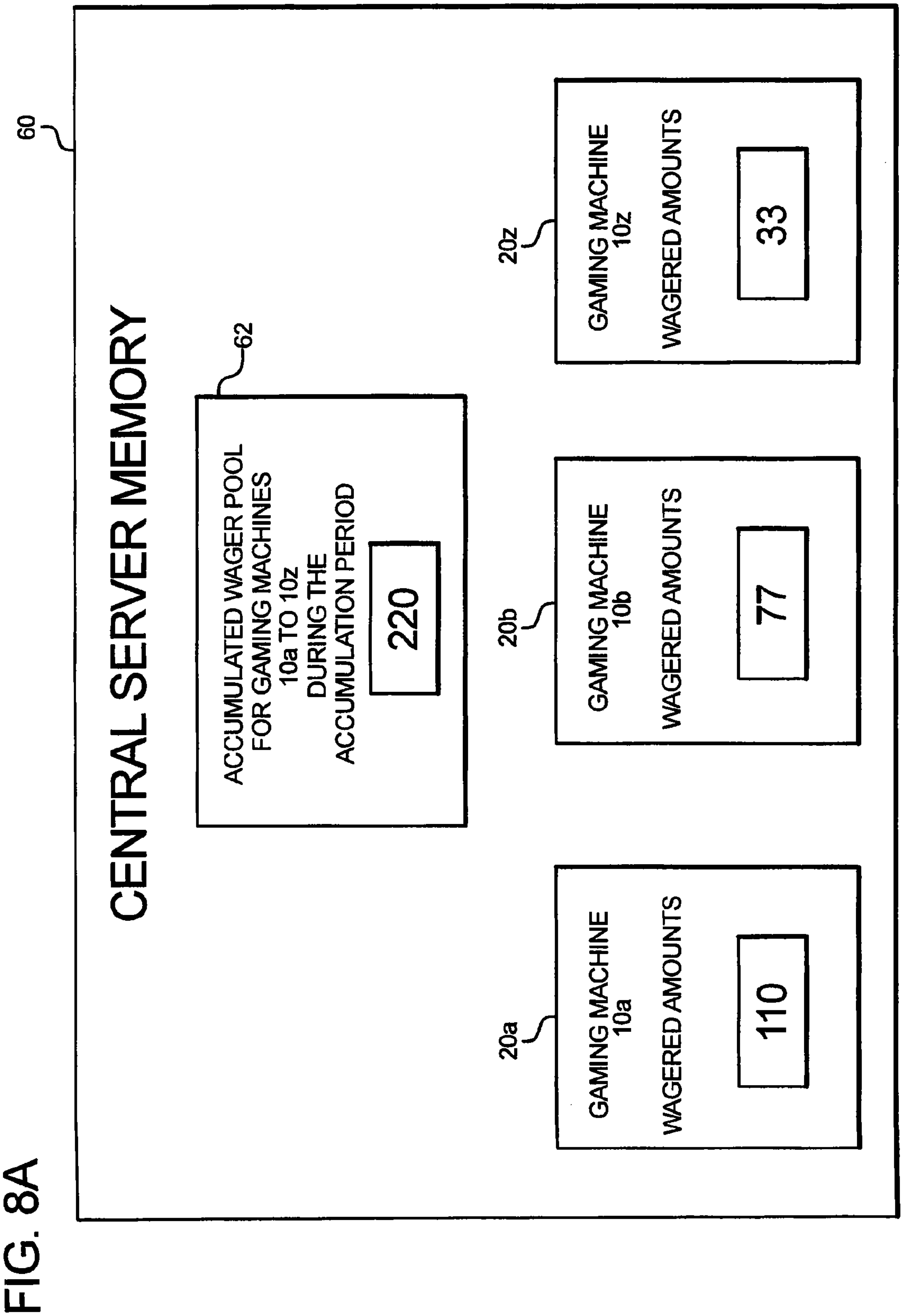
FIG. 8A is a schematic diagram of the memory of the central controller of FIG. 2B, and which generally illustrates one example of the accumulated value pool.
Figure 8B:
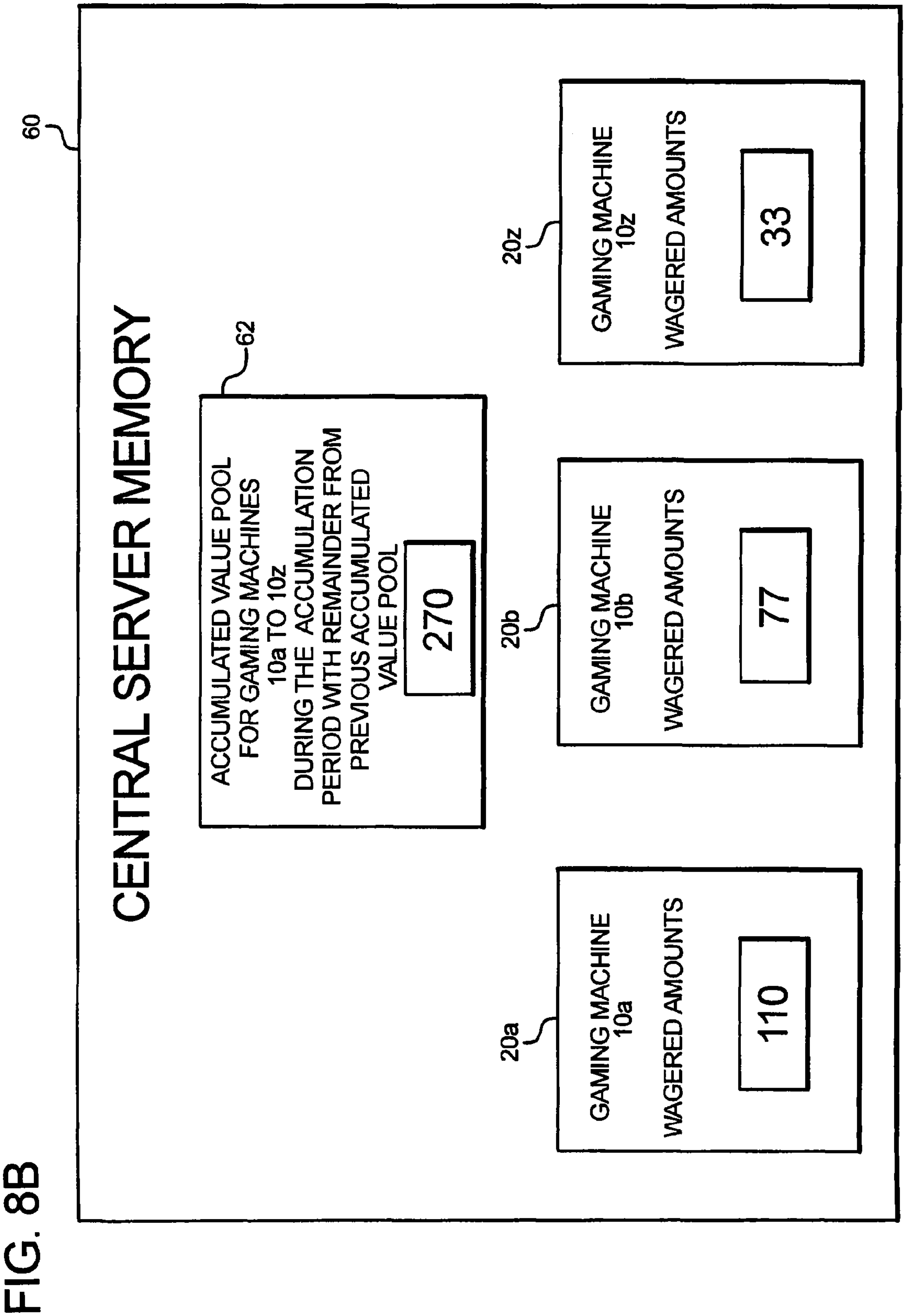
FIG. 8B is a schematic diagram of the memory of the central controller of FIG. 2B, and which generally illustrates an example of the accumulated value pool with a remainder from a previous accumulated value pool.

Referring now to FIGS. 8A and 8B, the central controller 56 tracks the play of the gaming machines 10*a*, 10*b* . . . 10*z* during the accumulation period. The central controller 56 includes coin-in or wager meters or counters 20*a*, 20*b* . . . 20*z* which respectively individually track the wagers placed on the primary games for each of the gaming machines 10*a*, 10*b* . . . 10*z* in the group. In one embodiment, the central controller 56 includes an accumulated value pool 62 which at least tracks the total coin-in or wagers placed on all of the primary games for the gaming machines 10*a*, 10*b* . . . 10*z* in the group. The individual gaming machine wager meters 20*a*, 20*b* . . . 20*z* and the accumulated value pool 62 may track the wagers made on the gaming machines in any suitable manner, such as in monetary units. Tracking in monetary units enables two or more of the gaming machines in the group to be of different denominations and also enables the individual gaming machines to have multiple denominations. In such embodiments, the monetary unit can be in the lowest common denomination. In one embodiment, every gaming machine of the system will also have a separate coin-in or wager meter. This may or may not be displayed by the gaming machines to the players.

As illustrated in FIG. 8A, the memory 60 of the central controller maintains an accumulated value pool 62 and the wagered amounts 20*a*, 20*b* . . . 20*z* for each gaming machine 10*a*, 10*b* . . . 10*z* in the group, respectively. In one embodiment, the accumulated value pool 62 includes the total amounts wagered by the players of the primary games for each of the gaming machines during the accumulation period.

The example shown in FIG. 8A illustrates the gaming system prior to the triggering of a first bidding sequence. The wagered amount on gaming machine 10*a* during is 110 monetary units, the wagered amount on gaming machine 10*b* is 77 monetary units, and the wagered amount on gaming machine 10*z* is 33 monetary units. Therefore, the accumulated value pool 62 includes 220 monetary units, as illustrated in FIG. 8A.

In one embodiment, at the start of each accumulation period, the accumulated value pool will be set to zero. Alternatively, the accumulated value pool is not reset to zero at the start of an accumulation period.

In one such embodiment, the accumulated value pool may start out at a base amount. The base amount may be predetermined, randomly determined, or determined based on any other suitable method. In one embodiment, the base amount in the accumulated value pool is funded from marketing dollars. That is, the accumulated value pool is funded, in part, from an amount provided by one or more marketing and/or advertising departments, such as a gaming establishment's marketing department or a third party marketing department. In another embodiment, the accumulated value pool may be entirely funded by marketing dollars. These marketing dollars are based on money set aside to attract players to the gaming establishment.

In another embodiment, the accumulated value pool includes a remainder at the start of an accumulation period. The remainder is any unaccounted portion of the accumulated value pool from the previous bonus event. For example, if the accumulated value pool reaches the target value of 500 (i.e., the average expected value of the bonus event), but the winning bidder only wins an award of 450 in the bonus event, there is a remainder of 50. That remainder is applied to the accumulated value pool to help fund the next bonus event. Thus, the accumulated value pool starts at 50. In such an embodiment, the target value that the accumulated value pool must reach to fund the next bonus event is equal to the average expected payout of the next bonus event, minus the remainder, minus the average or minimum bid.

Using this example and referring now to FIG. 8B, if a remainder of 50 monetary units exists from a previous accumulated value pool and the amounts wagered during the accumulation period are the same as in FIG. 8A, the accumulated value pool 62 will include 270 monetary units.

In another embodiment, at the start of an accumulation period, the accumulated value pool includes a portion of winning bids from previous bidding sequences, as will be discussed in more detail below.

Referring back to FIG. 3, in one embodiment, the central controller determines whether the accumulated value pool is at or above the target value, in connection with diamond 108. If the central controller determines that the accumulated value pool is not at or above the target value, the central controller continues enabling players to place wagers to play the primary games, as indicated by block 104.

If the central controller determines, in connection with diamond 108, that the accumulated value pool is at or above the target value, the central controller triggers the bidding sequence, as indicated by block 110. In another embodiment, each linked gaming device in a group builds its own accumulated value pool. In this embodiment, once one of the gaming devices determines that its accumulated value pool is at or above the target value, that gaming device requests the controller to trigger the bidding sequence.

In various alternative embodiments, rather than triggering the bidding sequence when the accumulated value pool reaches the target value, the central controller triggers the bidding sequence upon a separate or independent triggering event. In other words, the bidding sequence may be triggered at other times or by other triggering events, as will be discussed in more detail below.

As illustrated by block 112 of FIG. 3, once the bidding sequence is triggered, the central controller enables each player playing at a gaming device to place one more bids on an opportunity to participate in the bonus event.

In one alternative embodiment, the bidding sequence occurs prior to a future event, such prior to the triggering of the bonus event. In one such embodiment, the players do not know when the future event will take place. In one such embodiment, players bid on the opportunity to play the bonus event prior to the bonus event being triggered or becoming available. When the bonus event actually occurs, the player who won the bidding sequence participates in the bonus event. In such an embodiment, the winning bidder continues playing on the gaming device until the bonus event occurs.

In one such embodiment, the amount of the winning bid place in the pre-bidding sequence impacts when the bonus event will take place. For example, if the bonus event has an average expected payout of 400, and 1% of player coin in is allotted to a bonus pool, 40,000 must be wagered to fund the bonus event. If the winning bid in the pre-bidding sequence is 200, that bid of 200 covers half of the expected bonus award. To fund the rest of the expected bonus award, an additional 20,000 coin in is required. The 20,000 could come from all the gaming devices in the gaming system, a plurality of the gaming devices in the gaming system, the gaming device of player who won the pre-bidding sequence (through player tracking), or any combination of the above (e.g., half from all of the gaming devices and half from the winning bidder's gaming device). It should be appreciated that higher winning bids cause the bonus event to be provided quicker.

In one embodiment, rather than providing a bidding sequence, the central controller enables players playing at the gaming devices to place one or more side-bids during play of the primary game. The player who places the highest side-bid or highest accumulation of side bids during play of the primary game participates in the bonus event once it is triggered. In one embodiment, the side-bidding occurs on a separate display from the primary game display. In another embodiment, the side-bidding occurs on a separate part of the same display as the primary game.

Figure 4A:
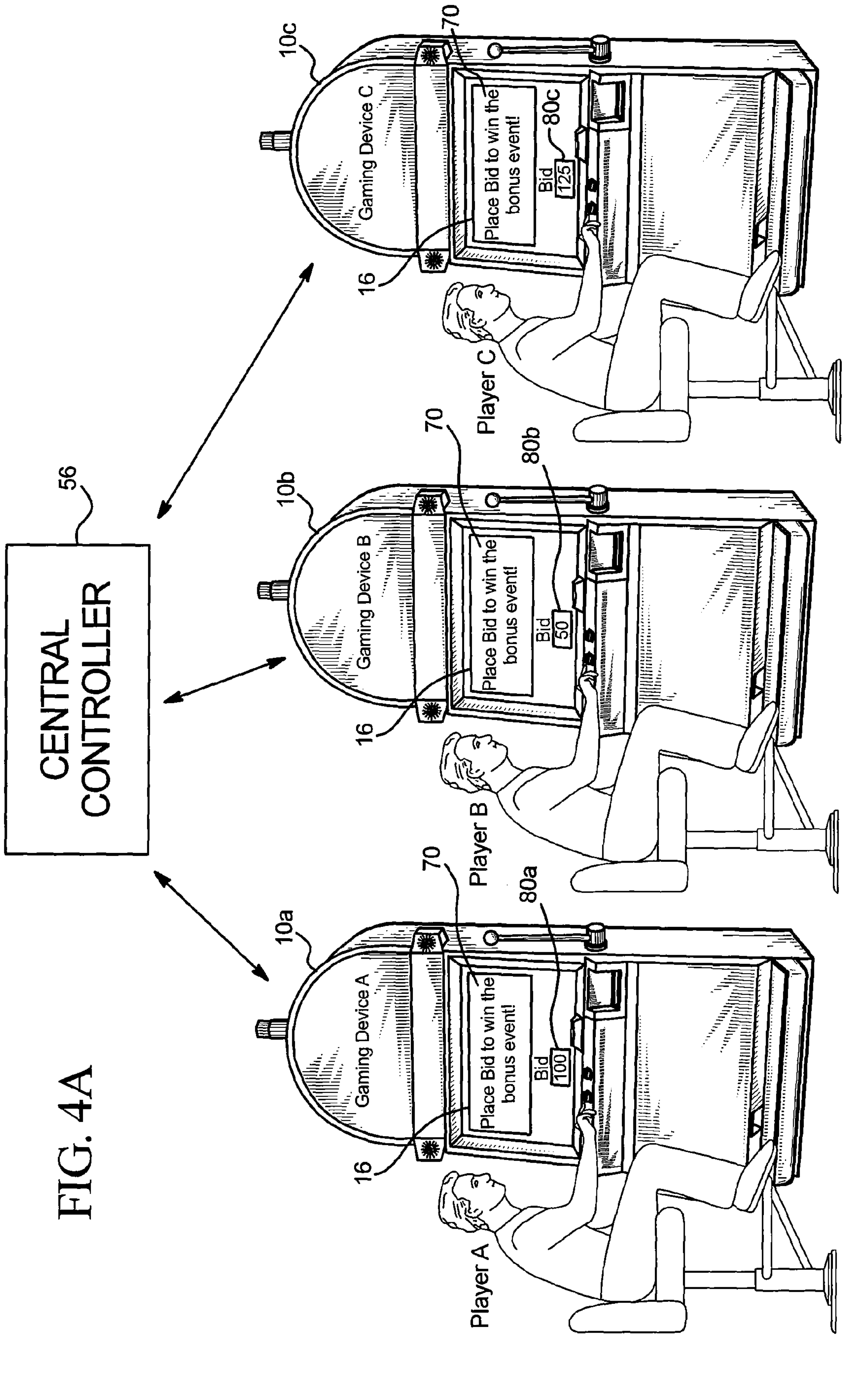
FIG. 4A is a diagram illustrating a plurality of gaming devices in communication with a central controller during the bidding sequence in one embodiment of the gaming system disclosed herein.

Referring now to FIG. 4A, in one embodiment, when the bidding sequence is triggered, the players playing at the gaming devices are provided with an indication, such as one or more lights, messages, or any other suitable indication which visually and/or audibly informs the players the bidding sequence is initiating. As seen in FIG. 4A, the display devices 16 or 18 of each of the gaming devices 10*a*, 10*b*, and 10*c* displays an audio, visual, or audiovisual message 70 prompting the players to place a bid to win the bonus opportunity.

In another embodiment, the players are provided with an indication, such a messages or any other suitable indication, before the bidding sequence is triggered. That is, the gaming devices inform the players that the bidding sequence is coming up. Thus, players are encouraged to continue playing at the gaming devices to get the opportunity to participate in a bonus event.

During the bidding sequence, in one embodiment, the central controller enables each player playing at a gaming device to place one bid. In another embodiment, the central controller enables each player playing at a gaming device to place a plurality of bids during the bidding sequence. In one embodiment, each player's bid is hidden from the other players until the bidding sequence is over. In another embodiment, the bidding sequence occurs in real time, and players' bids are revealed as they are made. In one embodiment, the central controller provides a limited amount of time for the bidding sequence. In one such embodiment, players may place a plurality of bids within the provided time.

In one embodiment, if not enough players are playing at the gaming devices, the central controller enables a player to bid against the gaming machine during the bidding sequence rather than competing against other players. In one such embodiment, the player must bid above a designated level or threshold to win the opportunity to participate in the bonus event. It should be appreciated that the designated level or threshold that the player must bid above may be predetermined, randomly determined, or determined in any other suitable manner.

In one embodiment, there is minimum bid amount in the bidding sequence (e.g., all bids must have a value of at least 10). In another embodiment, bids must be placed in designated increments, such as increments of 5. In one embodiment, there is a maximum amount that a player can bid. That is, each player can bid up to a limited amount. In one such embodiment, the amount that a player has wagered on the primary game has an impact on the maximum bid amount that that player can bid up to. In other embodiments, the amount that a player can bid up to is randomly determined, predetermined, or determined in any other suitable manner.

In another embodiment, the gaming system maintains a fixed price at which the player may purchase the opportunity to participate in the bonus event, instead of bidding for the bonus event in the bidding sequence. In such an embodiment, once the bidding sequence is triggered, one of the player's playing at a gaming device can choose to pay the fixed price, and that player is guaranteed participation in the bonus event. In one such embodiment, the bidding sequence stops once a player chooses to pay the fixed price. Alternatively, the bidding sequence continues, and the other players continue placing bids in attempt to win the bonus event for less than the cost of the fixed price.

In another embodiment, rather than the player determining the amount of the bid or bids placed during the bidding sequence, the gaming system calculates the amount of the bid for the player. In one such embodiment, the player sets a maximum amount that the player is willing to spend to participate in the bonus event. The gaming device bids for the player in the bidding sequence up to that specified maximum amount.

In another embodiment, the gaming system determines the amount of the bid that the player can place in the bidding sequence based on certain events that occur during play of the primary game, such as a number of wins, a number of losses, the amount won, and any other suitable events. In one embodiment, a bid meter keeps track of the player's bid, and when the bidding sequence is triggered, the player may place a bid having a value that is equal to the amount displayed in the bid meter. In one such embodiment, once the gaming device places the bid for the player, the credit meter resets to zero. In one embodiment, for players who do not win the bidding sequence (i.e., did not have the highest bid accumulated in the bid meter), the bid meter does not reset. That is, losing bidders keep the amount in the bid meter. Thus, the bidder who is the second place bidder in the bidding sequence, is the leader for the next bidding sequence.

Once the bidding sequence is complete, the central controller determines which bid is the winning bid, as indicated by block 110 of FIG. 3. In one embodiment, the winning bid is the highest bid placed during the bid sequence. In this embodiment, the player who places the highest bid participates in the bonus event.

Figure 4B:
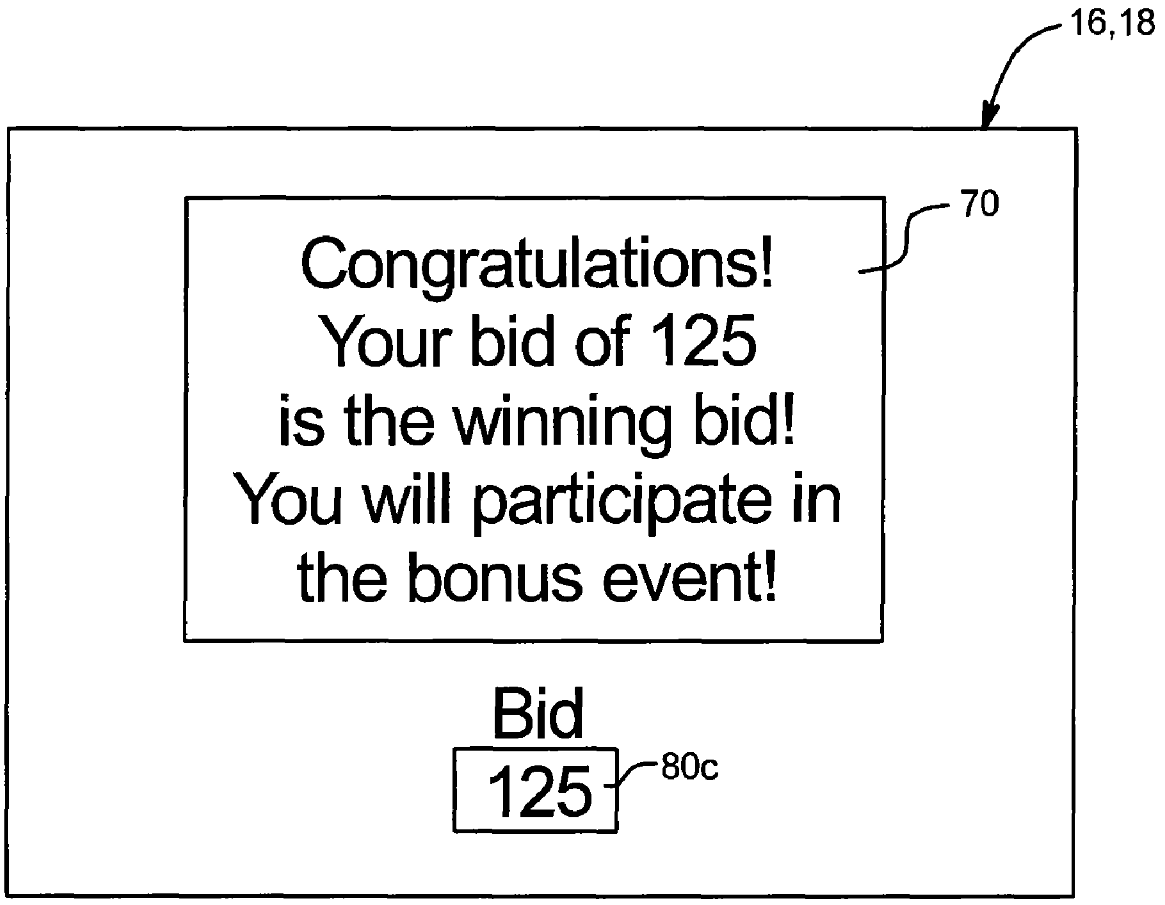
FIG. 4B is an enlarged front plan view illustrating the display device of one of the gaming devices of the embodiment of FIG. 4A after the bidding sequence is completed.

For example, referring again to FIG. 4A, the central controller enables each of the players playing at the gaming devices 10*a*, 10*b*, and 10*c* to place one bid in the bidding sequence. There are three players participating in the bidding sequence illustrated in FIG. 4A. Player A playing at the gaming device 10*a* has placed a bid 80*a* of 100, Player B playing at the gaming device 10*b* has placed a bid 80*b* of 50, and Player C playing at the gaming device 10*c* has placed a bid 80*c* of 125. Player C's bid 80*c* of 125 is the highest bid placed in the bidding sequence. As seen in FIG. 4B, the display device 16 or 18 of the gaming device 10*c* displays a message 70 informing Player C that his bid is the winning bid and Player C will participate in the bonus event.

In one alternative embodiment, multiple players can win the bidding sequence. For example, the top 3 bidders may win the opportunity to participate in the bonus event. In one such embodiment, the number of players that will have the chance to participate in the bonus event (i.e., the number of players that can win the bidding sequence) is randomly determined, predetermined, based on wager level, or determined in any other suitable manner. In another embodiment, each player participating in the bidding sequence who bids above a designated amount wins the bonus event. In one such embodiment, the player who places the highest bid in the bidding sequence, is provided with appropriate compensation for placing the highest bid. For example, the highest bidding player receives a rebate, a multiplier, a number of free spins, or any other suitable type of compensation, wherein the value of such compensation is substantially equal to the difference between the highest and lowest bids.

Referring now to FIG. 5, in one embodiment, the bidding sequence of the present disclosure is run under a timer. In this embodiment, the central controller provides a limited amount of time during which the players may place their bids. As illustrated by the table in FIG. 5, the controller provides a bidding sequence wherein three players, Players A, B, and C, have thirty seconds to place their bids on the opportunity to participate in the bonus event. In this embodiment, each player may place a plurality of bids within the thirty second time period in attempt to beat a previously placed bid. When the thirty-seconds have elapsed, Player B's bid of 100 is the highest bid placed during the bidding sequence. Thus, the central controller determines that the bid of 100 is the winning bid and identifies Player B as the winning bidder.

After the central controller determines which bid is the winning bid, the winning bidder or bidders participate in the bonus event, as illustrated by block 116 of FIG. 3. In some embodiments, the bonus event is a game event, such as a progressive, a bonus game, a free spin, a free game, or any other suitable type of game event. The bonus event may be randomly determined, predetermined or determined in some other manner by an implementer or designer of the gaming system. In different embodiments, the size of the winning bid determines the number of free spins provided to the player in the bonus event, the number of lines active in the bonus event, the size of the multiplier applied to the bonus event, or any other suitable aspect of the bonus event.

In one embodiment, the player or players who place a winning bid during the bidding sequence participate in a bonus event, wherein each participating player wins an award. In another embodiment, the players participating in the bonus event each win a portion or percentage of an award, wherein the portion won is based on each player's performance in the bonus event.

As indicated by block 118 of FIG. 3, the bonus event provides a bonus award to the player, wherein the bonus award is equal to, higher than, or lower than the winning bid. During the bidding sequence, the players are bidding below what they think the bonus event is worth. Thus, the player's feel as though they are getting value for their money when they place their bids. It should be appreciated that game operators will require the minimum bid for the bidding sequence to be greater than the lowest possible award in the bonus event. Since the bonus event may result in a bonus award having a lower value than what the player paid to fund the winning bid, this adds an element of risk to the bidding sequence.

In one embodiment, in addition to winning the bidding sequence, a player must place an additional wager to participate in the bonus event. In one embodiment, the player must make a separate side-wager on the bonus event or wager a designated amount in the primary game to qualify for the bonus event. In this embodiment, player must have placed the side-wager (or designated primary game wager amount) when the bonus event is triggered for that player to qualify to participate in the bonus event.

After the controller identifies the winning bidder in the bidding sequence, the winning bid can be funded from a credit meter, from a player's loyalty points, from a cash-in placed after the bid, debited from a player's account, charged to a credit card, or any other suitable form of payment. In certain embodiments, one or more of these payment methods could be applied simultaneously or substantially simultaneously to fund the winning bid. If cash-in after the bid is used to fund the bid, in one embodiment, appropriate time restrictions apply that award the bonus event to the second highest bidder if the winner does not make payment within the time window.

In one embodiment, a player may use bidding credits to fund the bid. In one embodiment, bidding credits are accumulated based on events that occur during primary game play. In different embodiments, bidding credits are awarded to players based on player coin in, time of play, player status, any other suitable aspect, or any combination of the above. For example, in one embodiment, bidding credits are awarded to players for obtaining designated symbol combinations during play of the primary game.

It should be appreciated that players may not use bidding credits to wager on the primary game. Bidding credits are used to fund winning bids from a bidding sequence. Thus, if a high bidder uses bidding credits to fund the bid, that player participates in the bonus event at no cost. In one embodiment, bidding credits are stored on the gaming device. In one embodiment, bidding credits accumulated through playing the primary game are lost if they are not used to fund a bid. Thus, some players may play the primary game long enough to accumulate an amount of bidding credits that is sufficient to cover the cost of a winning bid. In another embodiment, bidding credits are stored on a player tracking card. In one embodiment, if a player wishes to move from one gaming device to another gaming device, the player can transfer any accumulated bidding credits. In certain embodiments, bidding credits expire, such as after a designated amount of time.

In one embodiment, the central controller applies the winning bid from a previous bidding sequence to the accumulated value pool that funds the next bonus event. Alternatively, the operator sets a percentage of the player's winning bid that will be refunded to the accumulated value pool and keeps the remaining part of the player's bid as profit. In such embodiments, the target value that the accumulated value pool must reach to trigger the next bidding sequence (i.e., to be sufficiently funded to fund the next bonus event) is equal to the average expected payout of the next bonus event, minus the previous bid amount that is refunded back to the accumulated value pool, minus the minimum or average bid.

Referring again to the example of FIG. 5, if Player B's entire winning bid of 100 is reallocated back to the accumulated value pool to help fund the next bonus event, the accumulated value pool for the next bonus event starts at 100.

Figure 8C:
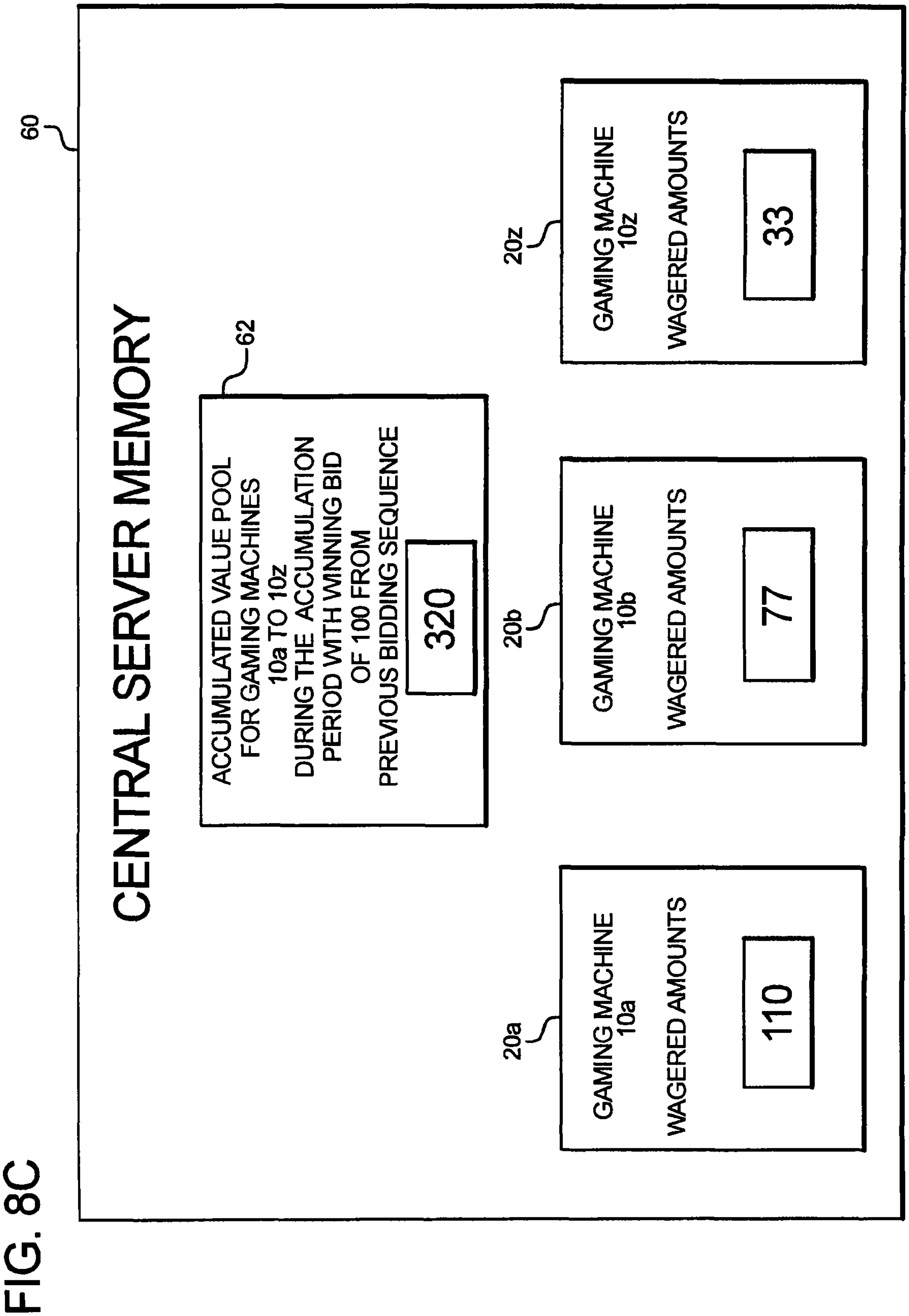
FIG. 8C is a schematic diagram of the memory of the central controller of FIG. 2B, and which generally illustrates an example of the accumulated value pool with a bid from a previous bidding sequence.

Using this example and referring now to FIG. 8C, if a previous bid of 100 is applied to the accumulated value pool to fund the next bonus event and the amounts wagered during the accumulation period are the same as in FIG. 8A, the accumulated value pool will include 320 monetary units. Thus, the accumulated value pool has a head start in meeting the target value, and the gaming system may provide the next bonus event quicker. Providing bonus events and awards quicker and/or more frequently increases player excitement.

It should be appreciated that if there is a remainder in the accumulated value pool, the remainder amount is also deducted from the target value that the accumulated value pool must reach. In an example where the accumulated value pool includes a bid from a previous bidding sequence and a remainder from a previous bonus event, the target value that the accumulated value pool must reach to fund the next bonus event is equal to the average expected payout of the next bonus event, minus the prior bid, minus the remainder, minus the average or minimum bid.

In another embodiment, part of or all of the winning bid is returned to the player. In one such embodiment, the bonus event is funded by primary game play. After the bidding sequence occurs and a winning bidder has been identified, the winning bidder receives any bonus award from the bonus event which is funded by the paytable, and the winning bidder receives part of or all of the winning bid. For example, if the paytable allocates 300 dollars for the bonus event, and the winning bidder in the bidding sequence placed a bid of 100 dollars, the bonus event provides 400 dollars to the winning bidder.

In one embodiment, players who participate in the bidding sequence but do not place the winning bid are not required to make payment on any losing bids. That is, losing bids are returned to the players. In another embodiment, the central controller applies one or more losing bids or portions of losing bids from a previous bidding sequence to the accumulated value pool that funds the next bonus event. In another embodiment, the losing bids are escrowed. In one embodiment, the non-winning bidders are provided with a consolation prize. In one such embodiment, non-winning bidders are provided with a mini-bonus game.

In one embodiment, if the winning bidder overbids, or wins the bidding sequence by placing a bid that is higher than the average expected payout of the bonus, a portion of the winning bid is returned to the player. For example, if the bonus event has an average expected payout of 500, and a player wins the bidding sequence with a bid of 600, that player has overbid by, on average, 100. In one such embodiment, a player who overbids is provided with an additional bonus. In another embodiment, the over-bidder is provided with a multiplier or an additional multiplier for the bonus event. In yet another embodiment, the over-bidder is provided with a flat rebate amount. In certain of the above embodiments, the over-bidder receives some type of compensation that is substantially equal to the amount by which the player has overbid. In various alternative embodiments, the over-bidder receives only a portion of the amount by which the player has overbid back. For example, if a player has overbid by 100, that player may receive a rebate of 50.

In one embodiment (not shown) where the bonus event includes a wheel, the wheel is associated with a plurality of indicators. In this embodiment, when the bidding sequence is triggered, the central controller enables each of the players playing at a gaming device to bid on one or more of the indicators. In this embodiment, the accumulated value pool associated with the group of gaming devices must be sufficient to fund an average expected value for each available indicator. For example, if the average expected payout for the wheel is 400 and the wheel has three available indicators, the accumulated value must achieve a target value of 1200 to trigger the bidding sequence. In one such embodiment, once the bidding sequence is triggered, each of the indicators has a separate bid associated with it. Thus, one player may bid on and win all the indicators associated with the wheel. Alternatively, different players may each bid on and win a different indicator associated with the wheel.

In one embodiment (not shown), each of the players playing at a gaming device participates in the bonus event. In other words, each of the players is guaranteed entrance into the bonus event and is provided with a bonus award, regardless of the outcome of any bidding sequence. In this embodiment, when the bidding sequence is triggered, rather than bidding for the opportunity to participate in the bonus event, the controller enables the players to bid on the chance to obtain a multiplier to be applied to the bonus event. In this embodiment, each player participates in the bonus event, but the player who places the winning bid during the bidding sequence wins the multiplier for the bonus event. In one such embodiment, the players are playing the same or different bonuses to which the multiplier is applied.

In another embodiment, the players bid on a plurality of different multipliers to be applied to the bonus event. In one such embodiment, the highest bidder wins the highest multiplier, and the players who placed lower bids are provided with lower multipliers corresponding to the value of their bids.

In one embodiment, each of the players participates in the bonus game and gets a multiplier for the bonus event, regardless of which player places the winning bid in the bidding sequence. In this embodiment, the players are bidding on the opportunity to enhance the multiplier by winning one or more additional multipliers via the bidding sequence. In such embodiments, the winning bidder in the bidding sequence wins one or more additional multipliers for the bonus event based on at least one of: (i) having placed the winning bid; (ii) the amount of the winning bid; (iii) whether the winning bid is at or above a threshold amount; and (iv) the winning bidder's wager level.

In another embodiment, the players bid on both the opportunity to participate in the bonus event and one or more multipliers for the bonus event. It should be appreciated that the gaming system may include any combination of the above embodiments.

In certain multiplier embodiments, in order to trigger the bidding sequence, the accumulated value pool associated with the group of gaming devices must be sufficient to fund the multiplier of the average expected payout of the bonus event. In an example embodiment, the bonus event is funded as part of the primary game, and the bonus game has an average expected payout of 400. To provide a 2× multiplier, the accumulated value pool must achieve a target value of 400 to trigger the bidding sequence. In this case, the average expected payout of the bonus event is 800 (i.e., 400×2) and an initial 400 is funded by the bonus game. Alternatively, in an embodiment where both the bonus event and the multiplier are funded by the accumulated value pool (i.e., there is no contribution from the primary game), the accumulated value pool must achieve a target value of 800 to trigger the bidding sequence.

In one alternative embodiment, the bidding sequence occurs in the middle of the bonus event. In one such embodiment, the bonus event is a multi-stage bonus event. For example, one type of bonus event may include a spin of an award wheel to generate an award value, and a subsequent selection of a multiplier to be applied to the generated award value. In this example embodiment, the bidding sequence is provided after the player spins the wheel, but prior to the selection of the multiplier. Thus, the players know the award value, and are bidding for the opportunity to receive that award value multiplied by the unknown multiplier. Once the bidding sequence is complete and a winning bidder is identified, the winning bidder picks the selection and reveals the multiplier that will be applied to the known award value. In one embodiment, the player who spins the wheel has earned the opportunity to spin the wheel from playing the primary game. In one embodiment, the player who earns the wheel spin receives the award value, but the award value, multiplied by the multiplier is available only to the highest bidder in the bidding sequence. In another embodiment, the bidding sequence is available if the spin of the wheel generates an award value above a designated threshold. In other words, a minimum event must occur in order to provide the bidding sequence to each of the players.

It should be appreciated that, in addition to triggering the bidding sequence by sufficiently funding the average expected payout of the bonus event, as described above, other suitable triggering events or accumulation of triggering events from one or more gaming devices can trigger the bidding sequence. Examples of events which trigger the bidding sequence include symbol-driven triggering events or other events based on game play and triggering events that are random and independent of game play, such as a randomized time or set time of day. In different embodiments, the triggering event may be based on at least one of: (i) an amount of time played collectively on the gaming devices; (ii) a random time of the day; (iii) an amount of money wagered collectively on the gaming devices; (iv) an amount of money lost collectively by the gaming devices; (v) an amount of money won collectively by the gaming devices; (vi) the size of the prior bid; (vii) the size of the prior bonus award; (viii) upon an event or outcome occurring in the primary game of one of the gaming devices; (ix) upon an event occurring due to a shared random outcome generation; (x) any other suitable triggering event; and (xi) any combination of the above.

In one embodiment where a separate or independent triggering event triggers the bidding sequence, the bonus event or a portion of the bonus event is funded by the paytable. In one example embodiment, the bonus event has an average expected payout of 200 and the accumulated value pool must reach a target value of 200 to trigger the bidding sequence. When the independent triggering event occurs, the accumulated value pool only has 100 and is, therefore, not sufficiently funded to fund the bonus event. The central controller enables the players playing at the gaming devices to place one or more bids on the opportunity to participate in the bonus event, and the paytable funds the additional 100 required to meet the average expected payout of the bonus event. In alternative embodiments, the bonus event is completely funded by the paytable independently of the accumulated value pool. In such embodiments, the accumulated value pool can continue to grow, rather than being used to fund the bonus event, and the next bidding sequence may be provided quicker.

In one embodiment, the game designer or implementer employs minimum bid requirements in response to variations in how frequently the bidding sequence is triggered. For example, in one embodiment having a high frequency of triggering of the bidding sequence, the game designer or implementer may require a high minimum bid in the bidding sequence. In an alternative embodiment having a low frequency of triggering of the bidding sequence, the game designer or implementer may require a low minimum bid in the bidding sequence.

In one alternative embodiment, an occurrence of a separate bonus triggering event causes the central controller to determine whether the accumulated value pool is large enough to provide the bidding sequence. In one such embodiment, the triggering of the bonus event occurs through a game play event, such as the generation of a designated symbol or symbol combination or any other suitable symbol-driven trigger, at an individual gaming machine in the gaming system. For example, the central controller may designated a symbol combination, such as 7-7-7, as a triggering event. If one of the gaming devices in the group generates the designated trigger of 7-7-7, that gaming device requests the central controller to trigger the bidding sequence. It should be appreciated that the central controller may designate any outcome in the primary game as a triggering event. That is, winning or losing outcomes in the primary game may be designated game outcomes, which when generated, trigger the bidding sequence.

In another embodiment, the triggering of the bonus event occurs independent of any game play event which may occur in any primary game or any secondary game played at one or more gaming machines in the gaming system. In one such embodiment, the triggering of the bonus event occurs based on at least one accumulated value progressive award incremented to a progressive award hit value. In this embodiment, the gaming system includes one or more accumulated value progressive awards or $N^{th}$ coin progressive awards. Such accumulated value progressive awards are driven by an amount of wagers placed or a suitable coin-in amount. In one such embodiment, each accumulated value progressive award is associated with a range of values, wherein each progressive award will be provided to a player of a gaming device in the gaming system when the progressive award increments to a progressive award hit value within the range of values associated with that progressive award. That is, when an accumulated value progressive award increases to a determined progressive award hit value, a triggering of the first bonus event will occur. In different embodiments, the progressive award hit value at which an accumulated value progressive award causes a triggering of the bonus event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a triggering of the bonus event to occur, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a triggering of the bonus event to occur when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In another embodiment, the triggering of the bonus event is based on time. In this embodiment, a time is set for when a triggering event will occur. In one embodiment, such a set time is based on historic data. For example, if previous bonus event triggers have occurred after approximately sixty-seven hours, a bonus event may be set to trigger sixty-seven hours from the conclusion of the previous bonus event. In one embodiment, a suitable algorithm is implemented to determine the player who wagered at or closest to this time with tie-breaking based on any number of factors (e.g., player tracking history, amount of or recent wagers placed). In this embodiment, the gaming device which the algorithm determined wagered closest to when the bonus event triggered is designated the triggering gaming device. In another embodiment, one of the gaming devices which placed a wager during a designated time period is randomly selected and designated as the triggering gaming device.

In another such embodiment, the triggering of the bonus event is based on a predefined variable reaching a defined parameter threshold. For example, the bonus event is triggered when the $500^{th}$ different player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for the progressive.

In another embodiment, the triggering of the bonus event occurs after a random number of plays in which a progressive award is not provided to a player. In another embodiment, the triggering of the bonus event is based upon gaming system operator defined player eligibility parameters stored on a player tracking system (such as via a player tracking card or other suitable manner). In another embodiment, the triggering of the bonus event is based upon gaming system operator defined player eligibility parameters stored on a player tracking system (such as via a player tracking card or other suitable manner).

In another such embodiment, the central controller determines, in cooperation with the gaming device, when to trigger a bonus event by utilizing one or more random number generators. In this embodiment, the central controller determines when to trigger a bonus event by determining if any numbers allotted to a gaming device match a randomly selected number. In one such embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine triggers a bonus event. It should be appreciated that any suitable manner of triggering the bonus event may be implemented with the gaming system disclosed herein.

In another alternative embodiment, only players playing at gaming devices which are in active status are enabled to participate in the bidding sequence. In one embodiment, the central controller determines the status of the gaming devices in the gaming system and provides zero, one or more players playing at gaming devices which are in active status a chance to participate in the bidding sequence. In this embodiment such determination is based, at least in part, on the status of each of the gaming devices in the gaming system. In one embodiment, the status of one or more gaming devices in the gaming system as either enrolled or inactive status or active status determines whether the player playing at those gaming devices are eligible to participate in the bidding sequence. The central controller determines that a gaming device is in active status, and thus provides the player playing at that gaming device a chance to participate in the bidding sequence, based on one or more criteria as described below.

The enrolled or inactive status means that the gaming device is one of the linked gaming devices in the group, but is not being actively played by a player during a bidding sequence qualification period (i.e., when the central controller is determining whether to cause the triggering of the bidding sequence). A gaming device may be classified as enrolled status for several reasons. For example, no player may be playing the gaming device. In another example, a player could be playing the gaming device (i.e., by having credits on the gaming device), but be playing too slowly or be interrupted during play. In this case, the player could have credits on the credit meter of the gaming device, but the player has not made a wager on a primary game or otherwise qualified to participate in the bidding sequence.

The active status means that the gaming device is being actively played by a player during a bidding sequence qualification period. In one embodiment, actively playing during a bidding sequence qualification period means that the player is playing the primary game of the gaming device (i.e., placing wagers on plays of the primary game) at least at a predefined minimum rate during a predefined time period. For example, the gaming device may be in active status when a player has made at least one play of the primary game in a fifteen second period prior to the triggering of the bidding sequence. In this example, the bidding sequence qualification period is that fifteen second period prior to the triggering of the bidding sequence.

In another embodiment, the active status is alternatively or additionally based on the amount wagered on the plays of the primary game during a bidding sequence qualification period. In a further alternative embodiment, the determination of the active status is based on a designated minimum number of plays of the primary game or number of wagers on the primary game in a designated time period. The determination of active status may take into account other factors such as interruptions or displays in play of the primary game such as caused by the triggering of other game events or the operation of other secondary games of the gaming devices. In another embodiment, a gaming device can only be determined to be an active gaming device if an additional wager, such as a side-bet or side-wager, is made by a player at a gaming device of the group for one player of a game, a plurality of plays of a game or all plays of a game in a designed period of time, such as a designed time period. It should be appreciated that a gaming device is classified as active based on any one or more suitable parameters or criteria as determined by the implementer or operator of the gaming system.

In another alternative embodiment, a minimum wager level is required for a player to qualify to participate in the bidding sequence. In one embodiment, this minimum wager level is the maximum wager level for the primary game in the gaming device. This requirement is in addition to the requirement that the player be playing at an active gaming device to participate in the bidding sequence. Another method for determining if the gaming device is active is whether or not the player has wagered a minimum level of monetary units since the occurrence of the last bidding sequence.

It should also be appreciated that one or more additional statuses may be employed. For instance, a gaming device will be in a participating status if an individual player playing the gaming device is a certain level player, such as a premier level player. Thus, only players of certain levels participate in the bidding sequence. This could be determined via a player tracking system or other player identification system. In one embodiment, the minimum bid required in the bidding sequence is set lower for higher level players.

It should be appreciated that other criteria can be used to determine if a gaming device is in the participating status. It should be further appreciated that when a gaming device is in the participating status, the gaming system automatically treats the gaming device as an active gaming device for purposes of the other determinations including eligibility to participate in the bidding sequence.

In one embodiment, the bidding sequence is independent of the primary game. In one such embodiment, each gaming machine in the gaming system provides one or more locally controlled primary wagering games (i.e., controlled by the gaming machine or processor) and also provides the bidding sequence which is controlled externally, such as by a remote host.

In one embodiment, the local processor enables a player to wager on a play of the primary game, generates a primary game outcome for the play of the primary game, causes part of the display device to display the play of the primary game, and receives at least one request from the remote host to provide the bidding sequence on the display device, if the bidding sequence is triggered. If the request to provide the bidding sequence is received, the local processor is programmed to accept the request to provide the bidding sequence and enables the remote host to cause a portion of the display device to display the bidding sequence, wherein the bidding sequence is displayed simultaneously with the play of the primary game. In one embodiment, the gaming device includes a separate display dedicated or substantially dedicated to providing the bidding sequence.

In one such embodiment, the gaming system enables one or more players at one or more gaming machines to interact with the gaming machine and/or the remote host via a customizable interface. In one embodiment, one or more aspects of the customizable interface are associated with functions performed by the remote host and one or more aspects of the customizable interface are associated with functions performed by the gaming machine. For example, in one embodiment, one aspect of the customizable interface is associated with the bidding sequence which is performed by the remote host, and one aspect of the customizable interface is associated with the primary game which is performed by the gaming machine. This configuration enables the primary game and the bidding sequence to be performed by different processors at different locations to be simultaneously displayed to the player, thus enhancing the player's gaming experience.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a controller;

a plurality of gaming devices configured to communicate with the controller, each gaming device including a primary game operable upon a wager by a player;

a bonus event; and an accumulated value pool associated with the plurality of gaming devices;

said controller programmed to:

(a) accumulate amounts in the accumulated value pool based on portions of a plurality of the wagers placed on the primary games, (b) determine if a triggering condition occurs, wherein the triggering condition is based at least in part on whether the accumulated value pool reaches a target value, and (c) if the triggering condition occurs:

(i) provide a bidding sequence, wherein at least one eligible player playing at said gaming devices is enabled to place at least one bid, (ii) determine which of the bids placed in the bidding sequence is a winning bid, and (iii) enable the player who places the winning bid to participate in the bonus event, wherein said bonus event results in a bonus award.

2. The gaming system of claim 1, wherein a player is eligible if that player is playing at one of the gaming devices which is in active status.

3. The gaming system of claim 1, wherein said controller is programmed to enable each eligible player to place one bid in the bidding sequence.

4. The gaming system of claim 3, wherein each player's bid is not displayed to the other players.

5. The gaming system of claim 1, wherein said controller is programmed to enable each eligible player to place a plurality of bids in the bidding sequence.

6. The gaming system of claim 1, which is configured to display each bid placed by each player to each of the other players.

7. The gaming system of claim 5, wherein said controller is programmed to provide a limited amount of time during which eligible players may place said plurality of bids.

8. The gaming system of claim 1, wherein the winning bid is the highest bid placed in the bidding sequence.

9. The gaming system of claim 1, wherein said bonus award has a bonus value of one of: (i) a bonus value greater than the value of the winning bid, (ii) a bonus value less than the value of the winning bid, and (iii) a bonus value equal to the value of the winning bid.

10. The gaming device of claim 1, wherein the target value is based on the average expected payout of the bonus event.

11. A gaming system comprising:

a plurality of gaming devices, each gaming device including a primary game operable upon a wager placed by a player, a bonus event adapted to be provided to at least one player playing the primary games of the gaming devices; and a controller in communication with the plurality of gaming devices, said controller programmed to:

(i) maintain an accumulated value pool based on at least the wagers placed on the gaming devices, (ii) determine whether a bonus event triggering condition occurs, (iii) if the bonus event triggering condition occurs, determine whether to provide a bidding sequence, wherein said determination is based at least in part on the accumulated value pool, (iv) if the determination is made to provide the bidding sequence, determine which of the players at the gaming devices are eligible to participate in the bidding sequence, (v) enable each eligible player to place at least one bid in the bidding sequence, (vi) determine which of said placed bids is a winning bid, and (vii) enable the player who places the winning bid to participate in the bonus event and cause a bonus award to be provided to said player.

12. The gaming system of claim 11, wherein a player is eligible if that player is playing at one of the gaming devices which is in active status.

13. The gaming system of claim 11, wherein an amount equal to a portion of each of the wagers placed by the players to play the primary games is added to said accumulated value pool.

14. The gaming system of claim 11, wherein the highest bid placed by one of the players is the winning bid.

15. The gaming system of claim 11, wherein the determination of whether to provide the bidding sequence is based at least in part on whether the accumulated value pool meets or exceeds a target value.

16. The gaming system of claim 15, wherein the target value is based on an average expected payout of the bonus event.

17. A gaming system comprising:

a controller;

a plurality of gaming devices configured to communicate with the controller, each gaming device including a primary game operable upon a wager placed by a player, an accumulated value pool associated with the plurality of gaming devices, wherein the accumulated value pool is based on wagers placed by players playing at said gaming devices;

a bonus event;

a bonus triggering event, said controller programmed upon an occurrence of said bonus triggering event to:

(a) determine whether said accumulated bonus pool meets or exceeds a target value, (b) if the accumulated value pool meets or exceed the target value, enable each eligible player playing at said gaming devices to place at least one bid, (c) determine which of said placed bids is a winning bid, (d) enable said eligible players to participate in the bonus event, and (e) provide a first bonus award to the player who placed the winning bid, and provide a second bonus award to each player who does not place the winning bid.

18. The gaming system of claim 17, wherein said bonus event is associated with a first multiplier and at least one second multiplier.

19. The gaming system of claim 18, wherein the first bonus award includes an award value modified by the first multiplier.

20. The gaming system of claim 18, wherein the second bonus award includes an award value modified by one of the second multipliers.

21. The gaming system of claim 18, wherein the first multiplier is larger than each of the second multipliers.

22. The gaming system of claim 18, wherein each of the second multipliers is equal to 1.

23. The gaming system of claim 17, wherein a player is eligible if that player is playing at one of the gaming devices in active status.

24. The gaming system of claim 17, wherein an amount equal to a portion of each of the wagers placed by the players to play the primary games is added to said accumulated value pool.

25. The gaming system of claim 17, wherein the winning bid is the highest bid.

26. The gaming system of claim 17, wherein the target value is based on an average expected payout of said bonus event.

27. A method of operating a gaming system, said gaming system including a plurality of gaming devices, each including a primary game operable upon a wager by a player, said method comprising:

(a) maintaining an accumulated value pool associated with the plurality of gaming devices;

(b) maintaining a bonus event;

(c) accumulating amounts in the accumulated value pool based on portions of a plurality of the wagers placed on the primary games;

(d) determining if a triggering condition occurs, wherein the triggering condition is based at least in part on whether the accumulated value pool reaches a target value; and (e) if the triggering condition occurs:

(i) providing a bidding sequence wherein at least one eligible player playing at said gaming devices is enabled to place at least one bid, (ii) determining which of the placed bids is a winning bid, and (iii) enabling the player who places the winning bid to participate in the bonus event, wherein said bonus event results in a bonus award.

28. The method of claim 27, wherein a player is eligible if that player is playing at a gaming device which is in active status.

29. The method of claim 27, which includes enabling each eligible player to place one bid in the bidding sequence.

30. The method of claim 29, which includes not displaying each player's bid to the other players.

31. The method of claim 27, which includes enabling each eligible player to place a plurality of bids in the bidding sequence.

32. The method of claim 27, which includes displaying each bid placed by each player to each of the other players.

33. The method of claim 31, which includes providing a limited amount of time during which the eligible players may place said plurality of bids.

34. The method of claim 27, wherein the winning bid is the highest bid placed in the bidding sequence.

35. The method of claim 27, wherein said bonus award has a bonus value of one of: (i) a bonus value greater than the value of the winning bid, (ii) a bonus value less than the value of the winning bid, or (iii) a bonus value equal to the value of the winning bid.

36. The method of claim 27, which is provided through a data network.

37. The method of claim 36, wherein the data network is an internet.

38. A method of operating a gaming system, said gaming system including a plurality of gaming devices, each including a primary game operable upon a wager by a player, said method comprising:

(a) maintaining an accumulated value pool based on at least the wagers placed on the gaming devices;

(b) maintaining a bonus event;

(c) determining if a bonus event triggering condition occurs;

(d) if the bonus event triggering condition occurs, determining whether to provide a bidding sequence, wherein said determination is based at least in part on the accumulated value pool; and (e) if the determination is made to provide the bidding sequence:

(i) determining which of the players are eligible to participate in the bidding sequence, (ii) enabling each of said eligible players to place at least one bid in the bidding sequence, (iii) determining which of the placed bids is a winning bid, and (iv) enabling the player who places the winning bid to participate in the bonus event, wherein said bonus event results in a bonus award.

39. The method of claim 38, wherein a player is eligible if that player is playing at one of the gaming devices which is in active status.

40. The method of claim 38, which includes adding an amount equal to a portion of each wager placed by the players to play the primary games to said accumulated value pool.

41. The method of claim 38, wherein the winning bid is the highest bid.

42. The method of claim 38, which includes determining whether to provide the bidding sequence based at least in part on whether the accumulated value pool meets or exceeds a target value.

43. The method of claim 42, wherein the target value is based on an average expected payout of the bonus event.

44. The method of claim 38, which is provided through a data network.

45. The method of claim 44, wherein the data network is an internet.

46. A method of operating a gaming system, said gaming system including a plurality of gaming devices, each including a primary game operable upon a wager by a player, said method comprising:

(a) maintaining an accumulated value pool associated with the plurality of gaming devices, wherein the accumulated value pool is based on wagers placed by players playing at said gaming devices;

(b) maintaining a bonus event triggered upon a bonus triggering event, and upon an occurrence of said bonus triggering event:

(i) determining whether said accumulated bonus pool meets or exceeds a target value, (ii) if said accumulated bonus pool meets or exceeds the target value, enabling each eligible player playing at said gaming devices to place at least one bid, (iii) determining which placed bid is a winning bid, (iv) enabling said eligible players to participate in the bonus event, and (v) providing a first bonus award to the player who places the winning bid, and providing a second bonus award to each player who does not place the winning bid.

47. The method of claim 46, wherein said bonus event is associated with a first multiplier and at least one second multiplier.

48. The method of claim 47, wherein the first bonus award includes an award value modified by the first multiplier.

49. The method of claim 47, wherein the second bonus award includes an award value modified by one of the second multipliers.

50. The method of claim 47, wherein the first multiplier is larger than each of the second multipliers.

51. The method of claim 47, wherein each of the second multipliers is equal to 1.

52. The method of claim 46, wherein a player is eligible if that player is playing at one of the gaming devices in active status.

53. The method of claim 46, which includes adding an amount equal to a portion of each wager placed by the players to play the primary games to said accumulated value pool.

54. The method of claim 46, wherein the winning bid is the highest bid.

55. The method of claim 46, wherein the target value is based on the average expected payout of said bonus event.

56. The method of claim 46, which is provided through a data network.

57. The method of claim 56, wherein the data network is an internet.

* * * * *

UNITED STATES PATENT AND TRADEMARK OFFICE

CERTIFICATE OF CORRECTION

PATENT NO. : 7,857,699 B2
APPLICATION NO. : 11/555516
DATED : December 28, 2010
INVENTOR(S) : Baerlocher It is certified that error appears in the above-identified patent and that said Letters Patent is hereby corrected as shown below:

In Claim 8, column 38, line 28, replace "the highest bid" with --a highest bid--.

In Claim 9, column 38, lines 31 to 32, replace "the value of" with --a value of--.

In Claim 14, column 39, line 5, replace "the highest bid" with --a highest bid--.

In Claim 25, column 39, line 58, replace "the highest bid" with --a highest bid--.

In Claim 34, column 40, lines 33 to 34, replace "the highest bid" with --a highest bid--.

In Claim 35, column 40, lines 36 to 37, replace "the value of" with --a value of--.

In Claim 41, column 41, lines 7 to 8, replace "the highest bid" with --a highest bid--.

In Claim 46, column 41, line 26, after "devices;" insert --and--.

In Claim 54, column 42, lines 26 to 27, replace "the highest bid" with --a highest bid--.

Signed and Sealed this
Eighth Day of March, 2011

David J. Kappos

David J. Kappos
*Director of the United States Patent and Trademark Office*